United States Patent
Yu et al.

(10) Patent No.: US 12,413,863 B1
(45) Date of Patent: Sep. 9, 2025

(54) OPTICAL SYSTEM AND CAMERA MODULE

(71) Applicant: NINGBO SUNNY OPOTECH CO., LTD, Zhejiang (CN)

(72) Inventors: Hang Yu, Zhejiang (CN); Anan Wu, Zhejiang (CN); Yu Wu, Zhejiang (CN); Meishan Guo, Zhejiang (CN); Hansheng Cen, Zhejiang (CN); Hao Zhang, Zhejiang (CN); Tongji Jiang, Zhejiang (CN); Liguo Liu, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 0 days.

(21) Appl. No.: 19/204,574

(22) Filed: May 11, 2025

(30) Foreign Application Priority Data

Nov. 19, 2024 (CN) .......................... 202411658809.3

(51) Int. Cl.
| | |
|---|---|
| *H04N 23/68* | (2023.01) |
| *G02B 7/10* | (2021.01) |
| *G02B 13/00* | (2006.01) |
| *G02B 15/14* | (2006.01) |

(52) U.S. Cl.
CPC .............. *H04N 23/687* (2023.01); *G02B 7/10* (2013.01); *G02B 13/0065* (2013.01); *G02B 15/1421* (2019.08)

(58) Field of Classification Search
CPC ..... G02B 7/10; G02B 15/1421; H04N 23/687
USPC ........................................................ 359/554
See application file for complete search history.

(56) References Cited

U.S. PATENT DOCUMENTS

| | | | | |
|---|---|---|---|---|
| 9,316,810 | B2 * | 4/2016 | Mercado | G02B 13/002 |
| 2006/0279697 | A1 * | 12/2006 | Clough | A61F 2/16 |
| | | | | 351/159.74 |
| 2013/0100325 | A1 * | 4/2013 | Wada | G02B 15/142 |
| | | | | 359/557 |

FOREIGN PATENT DOCUMENTS

| | | | | |
|---|---|---|---|---|
| CN | 117233924 | A | 12/2023 | |
| CN | 117706724 | A * | 3/2024 | ......... G02B 13/0065 |
| CN | 118550066 | A | 8/2024 | |
| CN | 118838035 | A * | 10/2024 | ............. H04N 23/57 |
| JP | 2012083705 | A | 4/2012 | |

OTHER PUBLICATIONS

The first office action of counterpart CN application No. 2024116588093 issued on Jan. 24, 2025.

\* cited by examiner

*Primary Examiner* — Pinping Sun
*Assistant Examiner* — Andrew R Wright
(74) *Attorney, Agent, or Firm* — The Sun IP Law

(57) ABSTRACT

Disclosed are an optical system and a camera module. The optical system sequentially includes, from an object side to an image side, a first lens, a reflective element and a second element group. The first lens has a positive refractive power, and allows propagation of light rays along a first optical axis. The reflective element changes light rays emitted from the first lens from propagating along the first optical axis to propagating along a second optical axis. The first lens and the reflective element constitute a first element group. The second element group has a positive refractive power. During an anti-shaking process, the position of an image plane of the optical system remains fixed, and the first element group rotates around a direction parallel to the second optical axis, an effective focal length f1 of the first lens and an effective focal length EFL of the optical system satisfy: $1.9<|f1/EFL|<3.0$.

17 Claims, 27 Drawing Sheets

Fig. 24
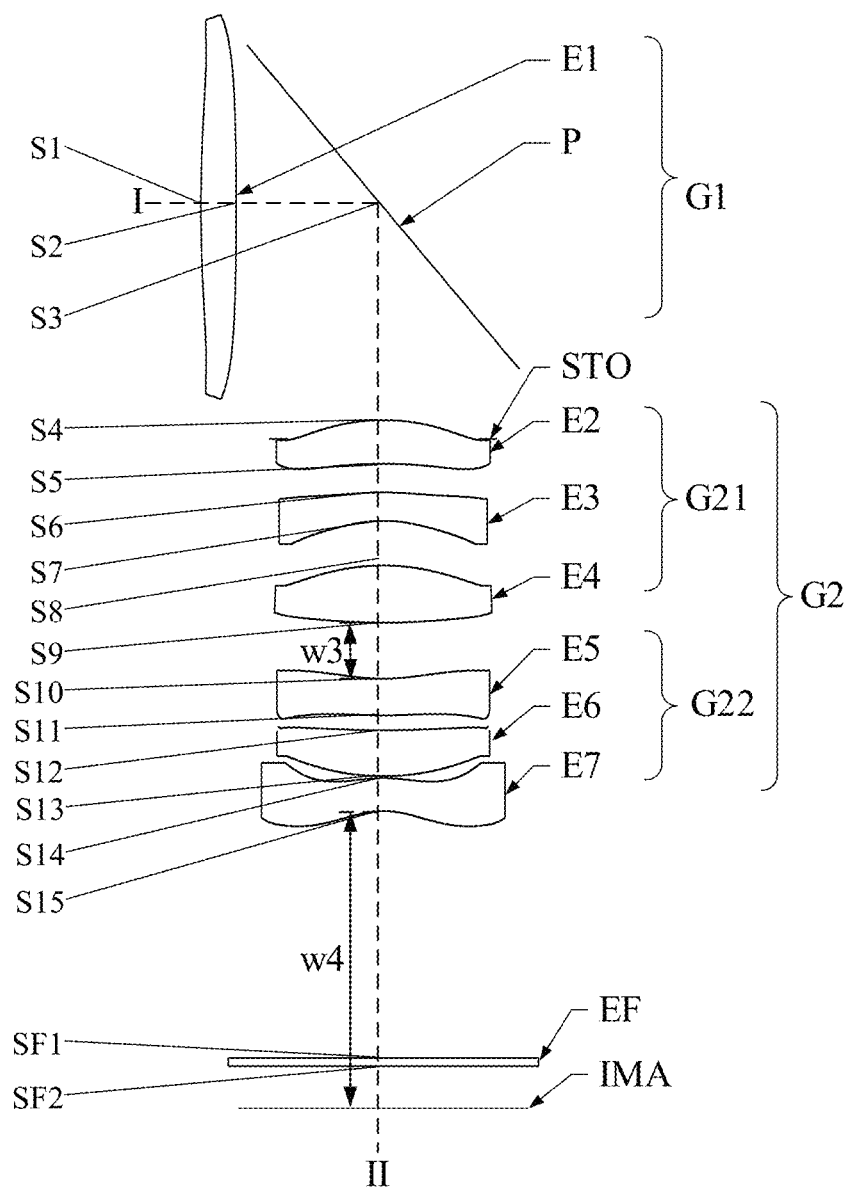
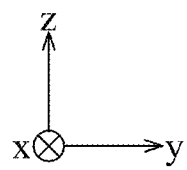

OPTICAL SYSTEM AND CAMERA MODULE

CROSS-REFERENCE TO RELATED APPLICATION(S)

This application claims priority to Chinese Application No. 202411658809.3 filed on Nov. 19, 2024, the entire contents of which are incorporated herein by reference for all purposes. No new matter has been introduced.

FIELD

The disclosure relates to the field of optical devices, and in particular, to an optical system and a camera module.

BACKGROUND

With the rapid development of portable electronic devices such as smart phones, telephoto lenses have been widely applied due to advantages such as being able to clearly image distant objects, large magnification, and being able to present detailed features of distant objects.

The effective focal length of an optical system is an important standard for measuring whether the optical system qualifies as a telephoto lens, and the larger the effective focal length of the optical system, the clearer a distant object photographed by the optical system. However, the effective focal length of the optical system is directly proportional to the optical path length required by the optical system, i.e. the larger the effective focal length of the optical system, the larger the optical path length required by the optical system. Therefore, in order to achieve the telephoto characteristic of the optical system, the total length of existing optical systems is generally large, which may severely limit the application of the optical systems in portable electronic devices.

SUMMARY

In an embodiment of the disclosure, an optical system is provided, which sequentially includes, from an object side to an image side along an optical axis, a first lens, a reflective element and a second element group. The first lens has a positive refractive power, and allows propagation of light rays along a first optical axis. The reflective element changes light rays emitted from the first lens from propagating along the first optical axis to propagating along a second optical axis. The first lens and the reflective element constitute a first element group. The second element group has a positive refractive power. During an anti-shaking process, the position of an image plane of the optical system remains fixed, and the first element group rotates around a direction parallel to the second optical axis, wherein the effective focal length f1 of the first lens and the effective focal length EFL of the optical system satisfy: $1.9<|f1/EFL|<3.0$.

In an embodiment, the maximum field of view FOV of the optical system satisfies: $0.1<\tan(FOV/2)<0.23$.

In an embodiment, the maximum effective half-aperture D1 of the first lens and the center thickness CT1 of the first lens on the first optical axis satisfy: $4.0<D1/CT1<4.7$.

In an embodiment, the second element group includes a movable lens group, and the effective focal length $FG2_m$ of the movable lens group and the effective focal length EFL of the optical system satisfy: $0.7<|FG2_m/EFL|<1.3$.

In an embodiment, the second element group includes a movable lens group, and the effective focal length f1 of the first lens and the effective focal length $FG2_m$ of the movable lens group satisfy: $2.2<|f1/FG2_m|<2.6$.

In an embodiment, the effective focal length f1 of the first lens and the effective focal length FG2 of the second element group satisfy: $0.9<|f1/FG2|<2.5$.

In an embodiment, the effective focal length EFL of the optical system and the total length SL of the optical system on the second optical axis satisfy: $0.6<EFL/SL<0.9$.

In an embodiment, the total length of the optical system on the second optical axis and the entrance pupil diameter EPD of the optical system satisfy: $3.2<SL/EPD<3.5$.

In an embodiment, the shoulder height GH of the optical system and the entrance pupil diameter EPD of the optical system satisfy: $0.7<GH/EPD<0.9$.

In an embodiment, the total height SH of the optical system and the entrance pupil diameter EPD of the optical system satisfy: $1.0<SH/EPD<1.15$.

In an embodiment, half of the diagonal length ImgH of an effective pixel area on the image plane and the effective focal length EFL of the optical system satisfy: $0.1<ImgH/EFL<0.3$.

In an embodiment, the second element group includes a second lens closest to the reflective element, and the angle α between a marginal ray of a central field of view after passing through the first lens and the first optical axis, and the angle β between a marginal ray of a central field of view after passing through the second lens and the second optical axis satisfy: $1.5<\tan\beta/\tan\alpha<1.8$.

In an embodiment, the radius of curvature L1S1R of an object-side surface of the first lens and the effective focal length EFL of the optical system satisfy: $1.4<L1S1R/EFL<1.6$.

In an embodiment, the second element group includes a second lens closest to the reflective element, and the radius of curvature L2S2R of an image-side surface of the second lens and the effective focal length EFL of the optical system satisfy: $0.8<L2S2R/EFL<2.4$.

In an embodiment, the second element group has a positive refractive power, and during a focusing process, the second element group moves along the second optical axis.

In an embodiment, the second element group sequentially includes, from the reflective element to the image side, a second lens having a positive refractive power, a third lens having a negative refractive power, a fourth lens having a positive refractive power, a fifth lens having a positive refractive power, and a sixth lens having a negative refractive power.

In an embodiment, the second element group sequentially includes, from the reflective element to the image side, a first lens group having a positive refractive power and a second lens group having a negative refractive power. During the focusing process, the position of the first lens group remains fixed, and the second lens group moves along the second optical axis.

In an embodiment, the first element group sequentially includes, from the reflective element to the second lens group, a second lens having a positive refractive power, a third lens having a negative refractive power, and a fourth lens having a positive refractive power. The second lens group sequentially includes, from the first lens group to the image side, a fifth lens having a negative refractive power, a sixth lens having a positive refractive power, and a seventh lens having a negative refractive power.

In an embodiment, the image plane is perpendicular to the second optical axis.

In another embodiment of the disclosure, a camera module is provided, which includes the described optical system and an imaging element for converting an optical image formed by the optical system into an electrical signal.

BRIEF DESCRIPTION OF DRAWINGS

Other features, objects and advantages of the disclosure will become more apparent upon reading the following detailed description of non-limiting embodiments with reference to the accompanying drawings. In which:

FIG. 24 shows a schematic structural diagram of an optical system according to Embodiment 5 of the disclosure.

Figure 1:
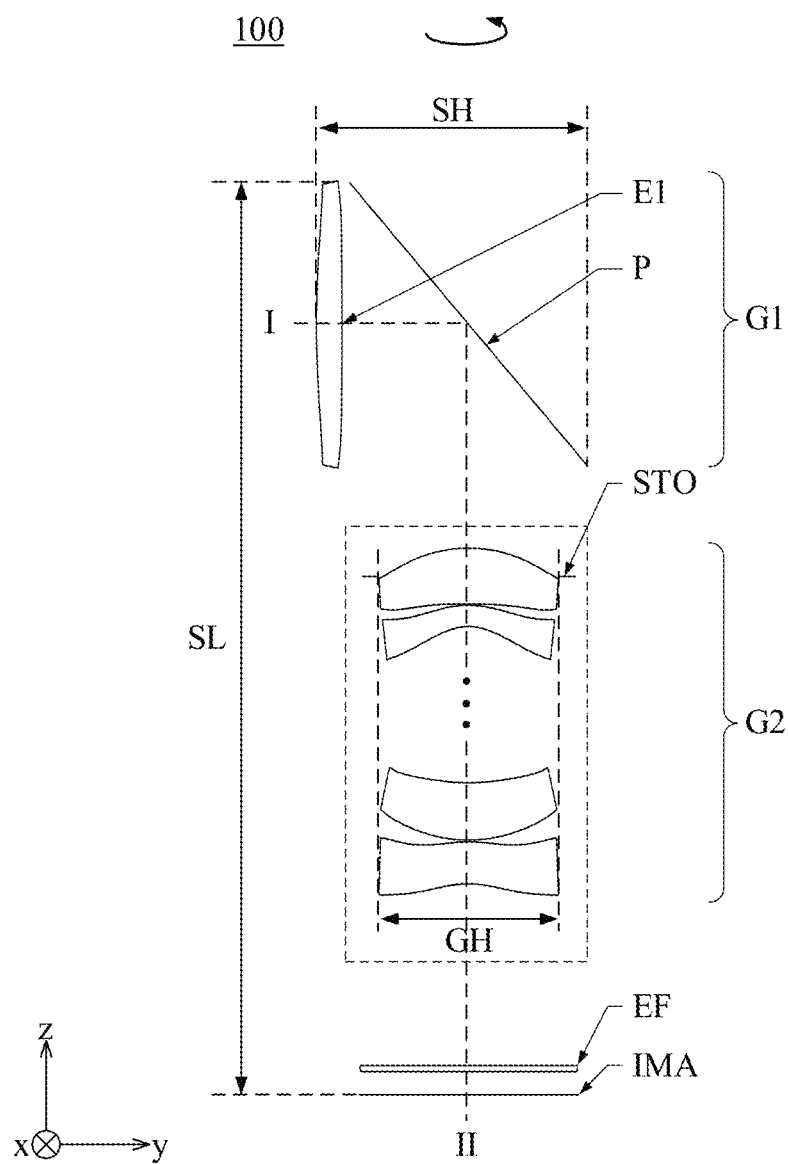
FIG. 1 shows a schematic structural diagram of an optical system according to an embodiment of the disclosure.

Description of the reference signs:

100. optical system; E1. first lens; E2. second lens; E3. third lens; E4. fourth lens; E5. fifth lens; E6. sixth lens; E7. seventh lens; EF. filter; P. reflective element; STO. diaphragm; G1. first element group; G2. second element group; G21. first lens group; G22. second lens group; IMA. image plane; 200. lens barrel assembly; 210. first lens barrel; 220. second lens barrel; and 230. third lens barrel.

DESCRIPTION OF EMBODIMENTS

In order to better understand the disclosure, various aspects of the disclosure will be described in more detail with reference to the accompanying drawings. It should be understood that these detailed descriptions are merely illustrative of embodiments of the disclosure and are not intended to limit the scope of the disclosure in any way. The same reference sign refers to the same element throughout the description.

It should be noted that in this description, expressions such as first, second and third are only used to distinguish one feature from another feature, and do not represent any limitation to the feature. Thus, a first lens discussed below may also be referred to as a second lens or a third lens without departing from the teachings of the disclosure.

In the accompanying drawings, the thickness, size and shape of lenses are slightly exaggerated for ease of illustration. Specifically, the spherical or aspheric shapes shown in the accompanying drawings are shown by way of example. That is, the spherical or aspheric shapes are not limited to the spherical or aspheric shapes shown in the accompanying drawings. The accompanying drawings are by way of example only and not strictly to scale.

In this text, the paraxial region refers to a region near the optical axis. If the lens surface is a convex surface and the position of the convex surface is not defined, it indicates that the lens surface is convex at least in the paraxial region; and if the lens surface is a concave surface and the position of the concave surface is not defined, it indicates that the lens surface is concave at least in the paraxial region. The surface of each lens closest to a photographed object is referred to as an object-side surface of the lens, and the surface of each lens closest to an imaging surface is referred to as an image-side surface of the lens.

It should also be understood that the terms "including" and/or "having", when used in this description, specify the presence of stated features, elements, and/or components, but do not preclude the presence or addition of one or more other features, elements, components, and/or any combination thereof. In addition, when describing embodiments of the disclosure, "may" is used to mean "one or more embodiments of the disclosure". Further, the term "exemplary" is intended to mean exemplary or illustrative.

Unless otherwise defined, all terms (including technical terms and scientific terms) used in this text have the same meanings as those commonly understood by a person of ordinary skill in the art to which the disclosure belongs. It should also be understood that terms (such as terms defined in commonly used dictionaries) should be interpreted as having meanings that are consistent with the meanings thereof in the context of the related art and will not be interpreted in an idealized or overly formal sense unless expressly so defined herein.

It should be noted that the embodiments in the disclosure and features in the embodiments are able to be combined with each other without conflicts.

A periscope camera module is a camera module capable of implementing long-distance photographing. For an optical system in the periscope camera module, a reflective element is able to be provided in the optical system, and the reflective element increases the effective focal length of the periscope camera module by folding an optical path, so that the total length of the periscope camera module is reduced while the periscope camera module meets the requirement of long focal length photographing, thereby implementing miniaturization of the periscope camera module.

In order to avoid or reduce shaking during capture of optical signals, the periscope camera module generally has an optical anti-shaking function. In the related art, one solution is to achieve the anti-shaking effect by means of movement of a photosensitive element. This solution relates to complex motor driving mechanism and circuit designs, thereby resulting in high costs. Another solution is to achieve the anti-shaking effect by means of movement of a reflective element, and this solution has a relatively simple driving mechanism design and low costs. However, implementing anti-shaking by means of movement of a reflective element may cause degradation of the imaging quality, thereby affecting the definition of final imaging. Therefore, how to reduce the cost of a camera module having an optical anti-shaking function while ensuring the imaging quality becomes one of the key research directions of manufacturers.

In order to at least partially solve one or more of the described problems or other potential problems, the disclosure provides an optical system. Specifically, an optical system having a low-cost optical anti-shaking function and good imaging quality is provided.

Hereinafter, some embodiments of the disclosure are described in detail with reference to the accompanying drawings and in conjunction with the embodiments.

Figure 2:
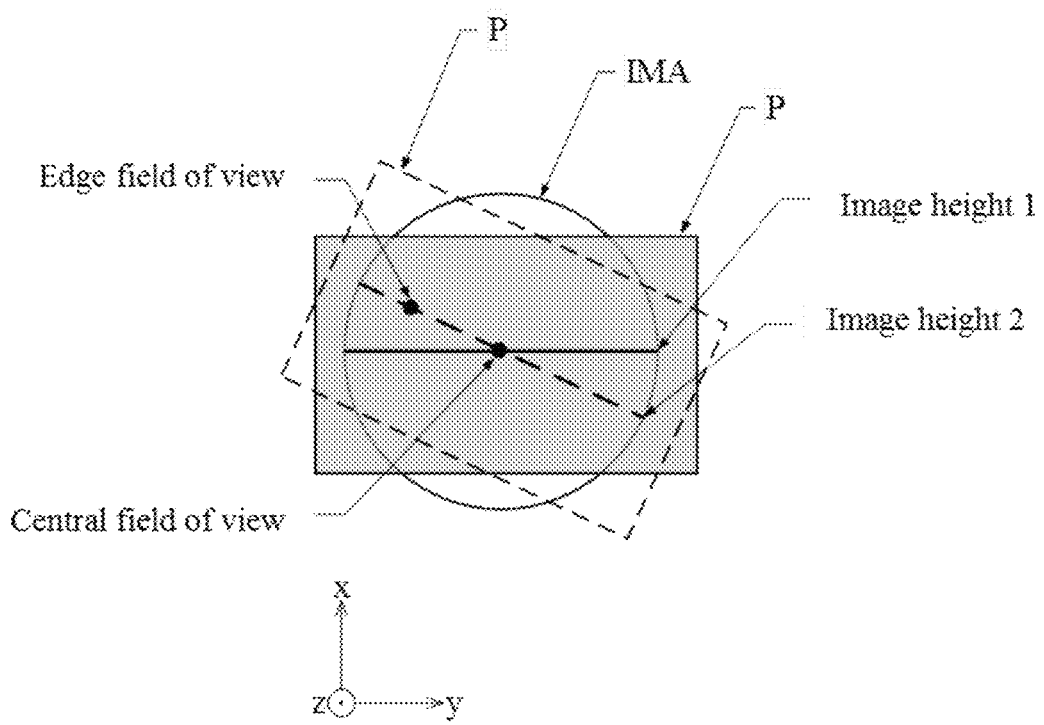
FIG. 2 shows a schematic diagram of an anti-shaking principle of an optical system according to an embodiment of the disclosure.

FIG. 1 shows a schematic structural diagram of an optical system according to an embodiment of the disclosure. FIG. 2 shows a schematic diagram of an anti-shaking principle of an optical system according to an embodiment of the disclosure. In an embodiment, the optical system is applied to a camera module, and in an embodiment, the camera module is a periscope camera module. It should be understood that the optical system is also able to be applied to other types of camera modules, which is not specifically limited in the disclosure.

As shown in FIG. 1, the optical system 100 is able to sequentially include, from an object side to an image side along an optical axis, a first lens E1, a reflective element P and a second element group G2. The first lens E1 and the reflective element P constitute a first element group G1. The first lens E1 has a positive refractive power and allows propagation of light rays along a first optical axis (hereinafter optical axis I for short). The reflective element P changes light rays emitted from the first lens E1 from propagating along the optical axis I to propagating along a second optical axis (hereinafter optical axis II for short). The second element group G2 sequentially includes at least five lenses from the reflective element P to the image side along the optical axis II. In an embodiment, the image side of the optical system 100 is provided with an image plane IMA. In an embodiment, the image plane IMA is perpendicular to the optical axis II.

It should be noted that the reflective element P is able to be arranged at any desired angle to change the propagation direction of light rays. In an embodiment, the reflective element P is able to be arranged such that incident light rays are deflected by a preset degree (such as but not limited to 90 degrees). Thus, the optical axis I and the optical axis II in this text is able to be at the predetermined angle (such as but is not limited to 90 degrees). In the disclosure, the optical system 100 is illustrated by taking the optical axis I being perpendicular to the optical axis II.

As shown in FIG. 1, the direction parallel to the optical axis I is defined as the y direction, the direction parallel to the optical axis II is defined as the z direction, and the direction perpendicular to both the y direction and the z direction is defined as the x direction. The optical system 100 is in a Cartesian coordinate system constructed with the x-direction, the y-direction and the z-direction. In this way, the image plane IMA is located in a plane defined by the x-direction and the y-direction. During an anti-shaking process, the position of the image plane IMA remains fixed, and the first element group G1 (i.e. the first lens E1 and the reflective element P) rotates around the z direction. In an embodiment, FIG. 2 shows the image plane IMA and the reflective element P viewed from the z direction. The solid rectangle indicates the position of the reflection member P in a non-anti-shaking state, and the solid straight line indicates the image height 1 in the non-anti-shaking state. The dotted rectangle indicates the position of the reflection member P in an anti-shaking state, and the dotted straight line indicates the image height 2 in the anti-shaking state. During the anti-shaking process, since the image plane IMA is located in the plane defined by the x direction and the y direction, and the first element group G1 rotates around the z direction, the image height 1 in the non-anti-shaking state and the image height 2 in the anti-shaking state only exhibit an angular rotation without any shift in height position, so that there is no imaging information loss, and thus the MTF axis value and the imaging effect and quality are not affected.

If the anti-shaking effect is achieved by rotating the first element group G1 around the y axis, since the image plane IMA is located in the plane defined by the x direction and the y direction, a shift in the height position may occur. For example, at an edge field of view, part of the imaging information of the rotated first element group G1 projected onto the image plane IMA may be lost, thereby affecting the imaging effect and quality, thus causing a significant drop in the MTF axis value.

Therefore, in the optical system 100 provided in the disclosure, anti-shaking is achieved by the movement of the first element group G1 including the reflective element P around the z direction, so that the design complexity of a driving mechanism for the first element group G1 may be reduced, the cost may be reduced, and it is also able to be ensured that imaging information is not lost, thereby improving the imaging quality.

In addition, in the optical system 100, the total length of the optical system 100 is able to be effectively shortened by providing the reflective element P, thereby satisfying the requirement of miniaturization. The first lens E1 having a positive refractive power converges light rays, so that the light rays are still in a converging state after being reflected by the reflective element P, increasing the number of light rays entering the second element group G2, thereby increasing the effective aperture of the optical system 100, and further improving the imaging quality of the optical system 100; moreover, the optical effective aperture of lenses in the second element group G2 is able to also be reduced, and the shoulder height of the second element group G2 is able to be reduced, thereby reducing the total height of the optical system 100.

The refractive power of the first lens E1 and the number of lenses in the second element group G2 are reasonably allocated, and the first element group G1 rotates around a direction (i.e. the z direction) parallel to the optical axis II, so that the optical system 100 has the characteristics of low anti-shaking costs, miniaturization, large aperture and good imaging quality.

In an embodiment, the optical system 100 further includes a diaphragm STO. In an embodiment, the diaphragm STO is provided between the reflective element P and the second element group G2. In an embodiment, the diaphragm STO is located on the optical axis II. In other words, the diaphragm STO is located in the plane defined by the x direction and the y direction. During the anti-shaking process, since the image plane IMA is located in the plane defined by the x direction and the y direction, and the first element group G1 rotates around the z direction, light rays involved in imaging may not be lost at the diaphragm STO when the rotated first element group G1 projects onto the image plane IMA. Compared with achieving the anti-shaking effect by rotating the first element group G1 around the y axis, light rays involved in imaging may be blocked by the diaphragm STO when the rotated first element group G1 projects onto the image plane IMA. For example, in the central field of view and the edge field of view (especially in the edge field of view), the light rays involved in imaging may be obstructed at the diaphragm STO, thereby affecting the MTF axis value and imaging quality. In an embodiment, the first lens E1 having a positive refractive power is configured to converge the light rays. By enabling the first lens E1 to have a convergence effect on the light rays, the light rays are able to be still in a converging state after being reflected by the reflective element P, increasing the number of light rays entering the second element group G2, and increasing the effective aperture (i.e. the light entering amount) of the optical system 100 without changing the physical aperture of the diaphragm STO. In other words, under the same light conditions, the optical system 100 is able to capture more light rays, thereby improving the imaging brightness of the optical system 100. In an embodiment, in a dark light environment, the optical system 100 with a large aperture is able to capture more light rays, which is especially important for improving the imaging quality of the optical system 100 and a camera module including the optical system 100 in the dark light environment.

In an embodiment, the effective focal length f1 of the first lens E1 satisfies 43.7 mm<f1<85.9 mm.

In an embodiment, the object-side surface of the first lens E1 is a convex surface in the paraxial region, and the image-side surface of the first lens E1 is a convex surface in the paraxial region.

It should be noted that the object-side surface of the first lens E1 being a convex surface means that the surface protrudes towards an object side, and the object-side surface of the first lens E1 being a concave surface means that the surface is recessed towards the object side. The image-side surface of the first lens E1 being a convex surface means that the surface protrudes towards an image side, and the image-side surface of the first lens E1 being a concave surface means that the surface is recessed towards the image side.

In an embodiment, the reflective element P is provided between the first lens E1 and the second element group G2. That is, the first lens E1 is located on the optical axis I and provided between the object side and the reflective element P, and the second element group G2 is located on the optical axis II and provided between the reflective element P and the image side (in an embodiment, the image plane IMA).

In an embodiment, the reflective element P is a plane mirror, and the plane mirror has a reflective surface. Light rays emitted from the first lens E1 along the direction of the optical axis I are totally reflected and redirected by the reflective surface of the reflective element P and are emitted to the second element group G2 along the direction of the optical axis II. The reflective surface of the reflective element P passes through the intersection point of the optical axis I and the optical axis II, that is, the reflective surface of the reflective element P is located on both the optical axis I and the optical axis II. By using a plane mirror with a small weight and a small size as the reflective element, the weight and size of the first element group G1 are able to be constrained within a certain range, so that the weight and size of the optical system 100 are able to be reduced as much as possible, and the driving burden of the reflective element P is reduced during an anti-shaking process.

It should be understood that the plane mirror only has a reflective surface, and the positions of the plane mirror facing a light incident side and a light emergent side are empty. This allows the first lens E1 to be closer to the plane mirror when the first lens E1 is provided, thereby reducing the height space occupied by the first lens E1 and the reflective element P, and thus reducing the total height of the optical system 100.

In an embodiment, there is a spacing distance between the first lens E1 and the reflective element P. By providing a spacing between the first lens E1 and the reflective element P, multiple options are able to be provided for the design of surface shapes of a side surface of the first lens E1 close to the reflective element P, improving the flexibility of the design of the surface shapes of the side surface of the first lens E1 close to the reflective element P.

It should be understood that there being a spacing distance between the first lens E1 and the reflective element P means that there is a gap between the side surface of the first lens E1 close to the reflective element P and at least part of the reflective element P, rather than the first lens E1 completely not being in contact with the reflective element P.

It should be understood that the number of lenses included in the first element group G1 being one is merely an example, and the number of lenses included in the first element group G1 is not specifically limited in the disclosure. In an embodiment, the first element group G1 includes a greater number (for example, more than one) of lenses.

In an embodiment, the first element group G1 has a positive refractive power. In an embodiment, the effective focal length FG1 of the first element group G1 satisfies: 43.7 mm<FG1<85.9 mm.

In an embodiment, the effective focal length FG1 of the first element group G1 and the effective focal length EFL of the optical system 100 satisfy: 1.9<FG1/EFL<3.0.

In an embodiment, the effective focal length FG2 of the second element group G2 satisfies: 25.8 mm<FG2<48.6 mm.

In an embodiment, the effective focal length FG2 of the second element group G2 and the effective focal length EFL of the optical system 100 satisfy: 1.2<FG2/EFL<2.2.

In an embodiment, the effective focal length FG1 of the first element group G1 and the effective focal length FG2 of the second element group G2 satisfy: 0.9<FG1/FG2<2.5. In another embodiment, FG1 and FG2 satisfy: 0.9<FG1/FG2<2.4.

It should be understood that the number of lenses included in the second element group G2 being four as shown in FIG. 1 is merely an example, and the number of lenses included in the second element group G2 is also not specifically limited in the disclosure. In some embodiments, the number of lenses included in the second element group G2 is at least five. In some embodiments, the number of lenses included in the second element group G2 is able to be five or six.

In addition, the number of element groups included in the optical system 100 being two is merely an example, and the number of element groups included in the optical system 100 is also not specifically limited in the disclosure. In some embodiments, the optical system 100 includes a greater number (for example, more than two) of element groups. In an embodiment, the optical system 100 further includes a filter EF. The filter EF is provided on an image side of the second element group G2. The filter EF is configured for filtering light rays emitted from the second element group G2. In an embodiment, the filter EF is an infrared filter.

Figure 3:
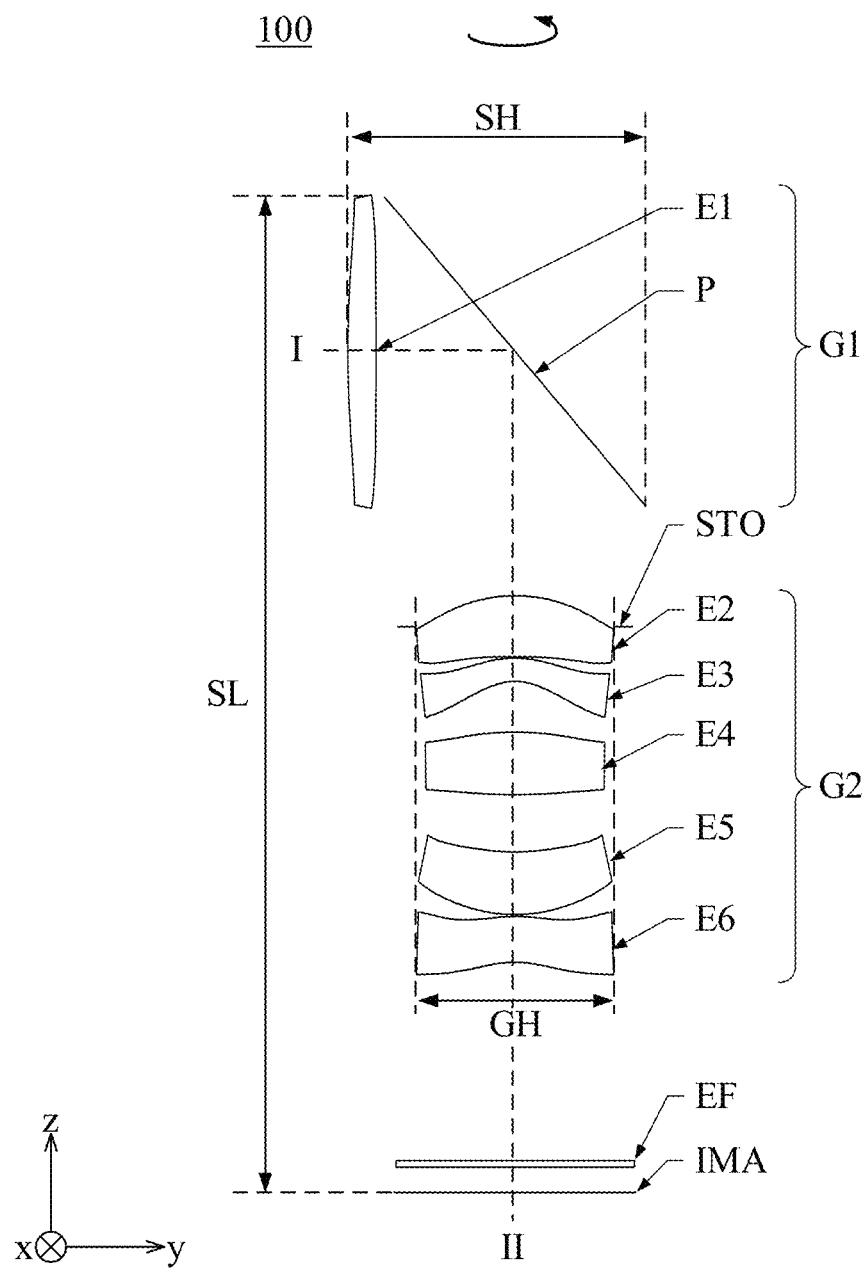
FIG. 3 shows a schematic structural diagram of an optical system according to another embodiment of the disclosure.

FIG. 3 shows a schematic structural diagram of an optical system according to another embodiment of the disclosure.

In the embodiment, as shown in FIG. 3, the second element group G2 has a positive refractive power. In other words, the combined focal length of the second lens E2 to the fifth lens E5 is greater than zero. In an embodiment, the effective focal length FG2 of the second element group G2 shown in FIG. 3 satisfies: 25.8 mm<FG2<36.0 mm.

In the embodiment, as shown in FIG. 3, the second element group G2 includes five lenses. The five lenses sequentially include, from the reflective element P to the image side (in an embodiment, the image plane IMA) along the optical axis II, a second lens E2, a third lens E3, a fourth lens E4, a fifth lens E5, and a sixth lens E6.

In an embodiment, the second lens E2 has a positive refractive power, the third lens E3 has a negative refractive power, the fourth lens E4 has a positive refractive power, the fifth lens E5 has a positive refractive power, and the sixth lens E6 has a negative refractive power.

In an embodiment, the object-side surface of the second lens E2 is a convex surface in the paraxial region, and the image-side surface is a concave surface in the paraxial region.

In an embodiment, the object-side surface of the third lens E3 is a convex surface in the paraxial region, and the image-side surface is a concave surface in the paraxial region.

In an embodiment, the object-side surface of the fourth lens E4 is a convex surface in the paraxial region, and the image-side surface is a convex surface in the paraxial region.

In an embodiment, the object-side surface of the fifth lens E5 is a concave surface in the paraxial region, and the image-side surface is a convex surface in the paraxial region.

In an embodiment, the object-side surface of the sixth lens E6 is a convex surface in the paraxial region, and the image-side surface is a concave surface in the paraxial region.

It should be noted that the object-side surface of any one of the second lens E2 to the sixth lens E6 being a convex surface means that the surface protrudes towards an object side, and the object-side surface of any one of the second lens E2 to the sixth lens E6 being a concave surface means that the surface is recessed towards the object side. The image-side surface of any one of the second lens E2 to the sixth lens E6 being a convex surface means that the surface protrudes towards an image side, and the image-side surface of any one of the second lens E2 to the sixth lens E6 being a concave surface means that the surface is recessed towards the image side.

In an embodiment, the second element group G2 as a whole serves as a movable lens group. During the focusing process, the second element group G2 moves along the optical axis II, that is, the distance between the reflective element P and the second element group G2 (in an embodiment, the second lens E2) is adjustable. When the distance (i.e. the object distance) between a photographed object and the optical system 100 changes, the distance between the reflective element P and the second element group G2 (in an embodiment, the second lens E2) is adjusted to achieve the focusing function of the optical system 100. In an embodiment, when the distance from the photographed object to the optical system 100 changes from far to near, the second element group G2 is able to move towards the reflective element P along the optical axis II, i.e. reducing the distance between the second element group G2 and the reflective element P on the optical axis II. When the distance from the photographed object to the optical system 100 changes from near to far, the second element group G2 is able to move towards the image side (in an embodiment, the image plane IMA) along the optical axis II, i.e. increasing the distance between the second element group G2 and the reflective element P on the optical axis II. The second element group G2 serves as a movable lens group for compensation.

In an embodiment, the spacing distances between respective lenses in the second element group G2 remain fixed during the focusing process.

In an embodiment, the movable travel LG2 of the second element group G2 satisfies: 1.7 mm<LG2<2.4 mm.

It should be understood that the number of lenses included in the second element group G2 being five is merely an example, and the number of lenses included in the second element group G2 is not specifically limited in the disclosure.

In an embodiment, at least one surface of the first lens E1 to the sixth lens E6 is an aspheric surface. The characteristic of an aspheric lens is that the curvature changes continuously from the center of the lens to the periphery of the lens. Unlike a spherical lens having a constant curvature from the center of the lens to the periphery of the lens, an aspheric lens has better radius of curvature characteristics, and has the advantages of reducing a distortion aberration and an astigmatic aberration. Once the aspheric lens is used, aberrations occurring during imaging may be eliminated as much as possible, thereby improving the imaging quality.

Figure 4:
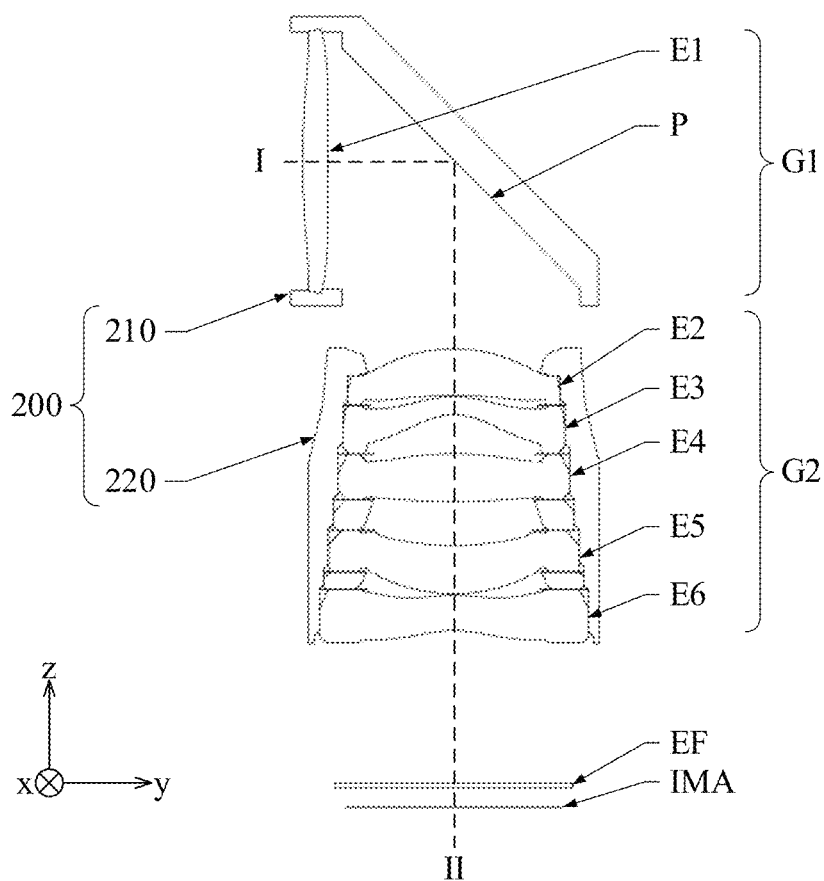
FIG. 4 shows a schematic structural diagram of an optical system including a lens barrel assembly according to another embodiment of the disclosure.

FIG. 4 shows a schematic structural diagram of an optical system including a lens barrel assembly according to an embodiment of the disclosure.

In the embodiment, as shown in FIG. 4, the optical system 100 further includes a lens barrel assembly 200. The lens barrel assembly 200 includes a first lens barrel 210 and a second lens barrel 220. The first element group G1 is fixed in the first lens barrel 210. The second element group G2 is fixed in the second lens barrel 220. The first lens barrel 210 has a first opening located at a light incident side and a second opening located at a light emergent side, the first lens E1 is arranged in the first opening, and the reflective element P is arranged between the first opening and the second opening. The inner diameters of portions corresponding to different lenses of the second lens barrel 220 are different.

During the anti-shaking process of the optical system 100, the first lens barrel 210 is able to drive the first element group G1 arranged therein to rotate around the z direction.

During the focusing process of the optical system 100, the second lens barrel 220 is able to drive the second element group G2 arranged therein to move along the optical axis II. In an embodiment, when the distance from the photographed object to the optical system 100 changes from far to near, the second lens barrel 220 is able to drive the second element group G2 arranged therein to move towards the reflective element P along the optical axis II. When the distance from the photographed object to the optical system 100 changes from near to far, the second lens barrel 220 is able to drive the second element group G2 arranged therein to move towards the image side (in an embodiment, the image plane IMA) along the optical axis II.

In an embodiment, during the anti-shaking or the focusing process, or the anti-shaking and the focusing process of the optical system 100, the first lens barrel 210 and the first element group G1 arranged therein are driven by a first motor (not shown), and the second lens barrel 220 and the second element group G2 arranged therein is driven by a second motor (not shown). In addition, the position of the image plane IMA remains fixed.

Figure 5:
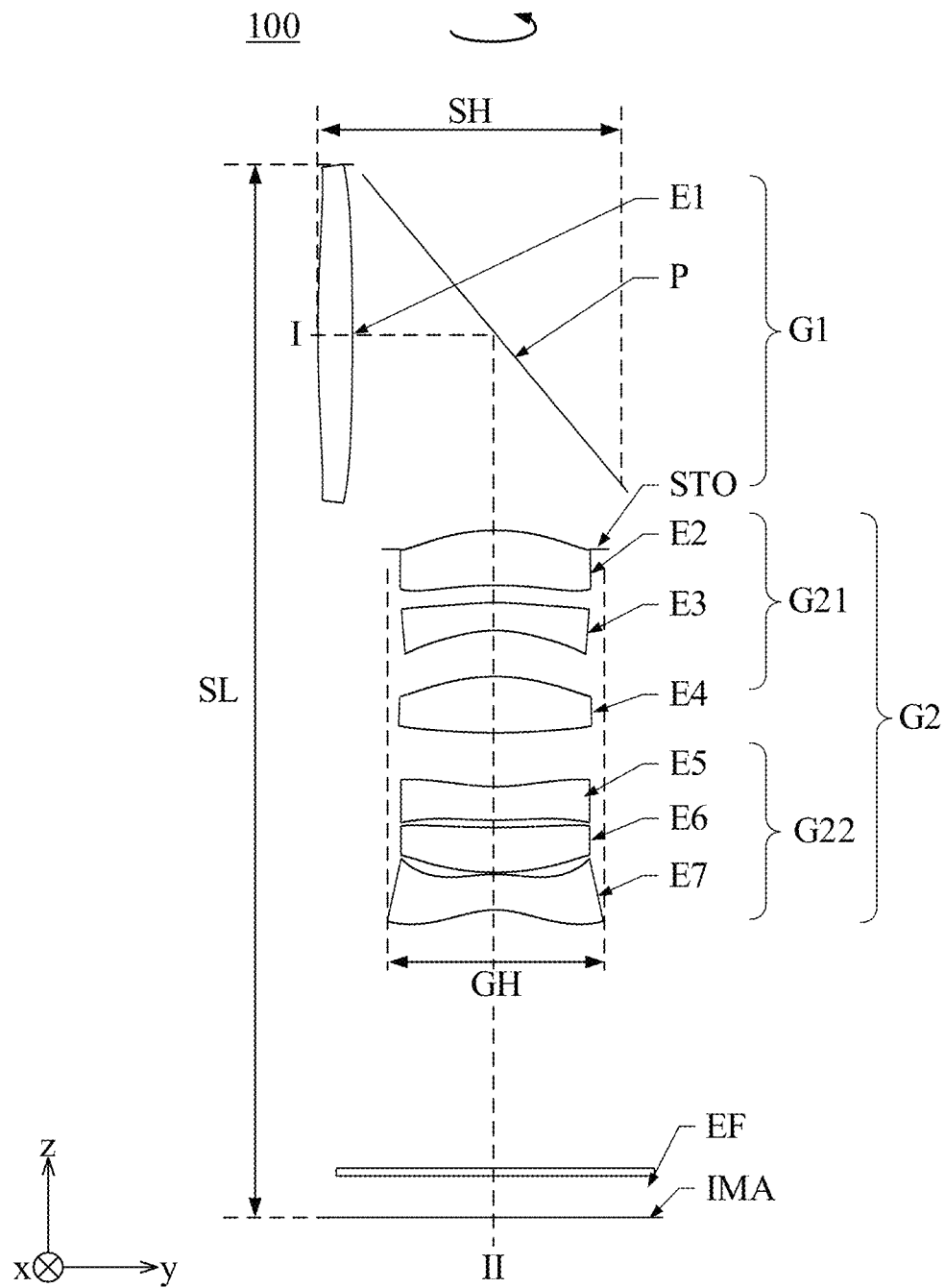
FIG. 5 shows a schematic structural diagram of an optical system according to still another embodiment of the disclosure.

FIG. 5 shows a schematic structural diagram of an optical system according to still another embodiment of the disclosure.

In the embodiment, as shown in FIG. 5, the second element group G2 has a positive refractive power. In other words, the combined focal length of the second lens E2 to the sixth lens E6 is greater than zero. In an embodiment, the effective focal length FG2 of the second element group G2 satisfies: 47.2 mm<FG2<48.6 mm.

In an embodiment, the second element group G2 includes, from the reflective element P to the image side (in an embodiment, the image plane IMA), a first lens group G21 and a second lens group G22. The first lens group G21 is able to serve as a fixed lens group, and the second lens group G22 is able to serve as a movable lens group.

In an embodiment, the first lens group G21 has a positive refractive power. The effective focal length FG21 of the first lens group G21 satisfies: 16.5 mm<FG21<16.7 mm.

In an embodiment, the second lens group G22 has a negative refractive power. The effective focal length FG22 of the second lens group G22 satisfies: −17.6 mm<FG22<−17.4 mm.

In an embodiment, the effective focal length FG21 of first lens group G21 and the effective focal length FG22 of the second lens group G22 satisfy: −0.96<FG21/FG22<−0.94.

In an embodiment, the effective focal length FG1 of the first element group G1 (in an embodiment, the effective focal length f1 of the first lens E1) and the effective focal length FG21 of the first lens group G21 satisfy: 2.6<FG1/FG21<2.8.

In an embodiment, the effective focal length FG1 of the first element group G1 (in an embodiment, the effective focal length f1 of the first lens E1) and the effective focal length FG22 of the second lens group G22 satisfy: 2.4<|FG1/FG22|<2.6.

It should be understood that the number of lenses included in the first lens group G21 being three is merely an example, and the number of lenses included in the second lens group G22 being three is also merely an example; and the number of lenses respectively included in the first lens group G21 and the second lens group G22 is not specifically limited in the disclosure. In some embodiments, in the case where the number of lenses in the second element group G2 is six, the numbers of lenses included in the first lens group G21 and the second lens group G22 are three and three, two and four, one and five, four and two, and five and one, respectively. In addition, the number of lens groups included in the second element group G2 being two is merely an example, and the number of lens groups included in the second element group G2 is not specifically limited in the disclosure. In some embodiments, the second element group G2 includes a greater number (in an embodiment, more than two) of lens groups.

In an embodiment, the first lens group G21 includes, from the reflective element P to the image side (in an embodiment, the image plane IMA), a second lens E2, a third lens E3, and a fourth lens E4. The second lens group G22 sequentially includes, from the first lens group G21 to the image side (in an embodiment, from the fourth lens E4 to the image plane IMA), a fifth lens E5, a sixth lens E6, and a seventh lens E7. In other words, in the second element group G2, the second lens E2, the third lens E3, the fourth lens E4, the fifth lens E5, the sixth lens E6, and the seventh lens E7 are sequentially arranged from the reflective element P to the image side (in an embodiment, the image plane IMA). The second lens E2, the third lens E3, and the fourth lens E4 constitute the first lens group G21; and the fifth lens E5, the sixth lens E6, and the seventh lens E7 constitute the second lens group G22.

In an embodiment, in the first lens group G21, the second lens E2 has a positive refractive power, the third lens E3 has a negative refractive power, and the fourth lens E4 has a positive refractive power. In the second lens group G22, the third lens E5 has a negative refractive power, the sixth lens E6 has a positive refractive power, and the seventh lens E7 has a negative refractive power.

In an embodiment, the object-side surface of the second lens E2 is a convex surface in the paraxial region, and the image-side surface is a concave surface in the paraxial region.

In an embodiment, the object-side surface of the third lens E3 is a convex surface in the paraxial region, and the image-side surface is a concave surface in the paraxial region.

In an embodiment, the object-side surface of the fourth lens E4 is a convex surface in the paraxial region, and the image-side surface is a convex surface in the paraxial region.

In an embodiment, the object-side surface of the fifth lens E5 is a concave surface in the paraxial region, and the image-side surface is a convex surface in the paraxial region.

In an embodiment, the object-side surface of the sixth lens E6 is a concave surface in the paraxial region, and the image-side surface is a convex surface in the paraxial region.

In an embodiment, the object-side surface of the seventh lens E7 is a convex surface in the paraxial region, and the image-side surface is a concave surface in the paraxial region.

It should be noted that the object-side surface of any one of the second lens E2 to the seventh lens E7 being a convex surface means that the surface protrudes towards an object side, and the object-side surface of any one of the second lens E2 to the seventh lens E7 being a concave surface means that the surface is recessed towards the object side. The image-side surface of any one of the second lens E2 to the seventh lens E7 being a convex surface means that the surface protrudes towards an image side, and the image-side surface of any one of the second lens E2 to the seventh lens E7 being a concave surface means that the surface is recessed towards the image side.

In an embodiment, the first lens group G21 serves as a fixed lens group, and the second lens group G22 serves as a movable lens group. During the focusing process, the position of the first lens group G21 remains fixed, and the second lens group G22 moves along the optical axis II. In other words, the distance between the first lens group G21 and the second lens group G22 (in an embodiment, between the fourth lens E4 and the fifth lens E5) is adjustable. When the distance (i.e. the object distance) between a photographed object and the optical system 100 changes, the distance between the first lens group G21 and the second lens group G22 (in an embodiment, between the fourth lens E4 and the fifth lens E5) is adjusted to achieve the focusing function of the optical system 100. In an embodiment, when the distance from the photographed object to the optical system 100 changes from far to near, the second lens group G22 is able to move towards the image side (in an embodiment, the image plane IMA) along the optical axis II, i.e. increasing the distance between the second lens group G22 and the first lens group G21 on the optical axis II. When the distance from the photographed object to the optical system 100 changes from near to far, the second lens group G22 is able to move towards the first lens group G21 along the optical axis II, i.e. reducing the distance between the second lens group G22 and the first lens group G21 on the optical axis II. The second lens group G22 in the second element group G2 is able to serve as a movable lens group for compensation, for example, aberration compensation, thereby improving the imaging quality.

In an embodiment, during the focusing process, the spacing distances between respective lenses in the first lens group G21 remain fixed, and the spacing distances between respective lenses in the second lens group G22 remain fixed.

In an embodiment, the movable travel LG22 of the second lens group G22 satisfies: 1.4 mm<LG22<1.6 mm.

In an embodiment, at least one surface of the first lens E1 to the seventh lens E7 is an aspheric surface. Once the aspheric lens is used, aberrations occurring during imaging may be eliminated as much as possible, thereby improving the imaging quality.

Figure 6:
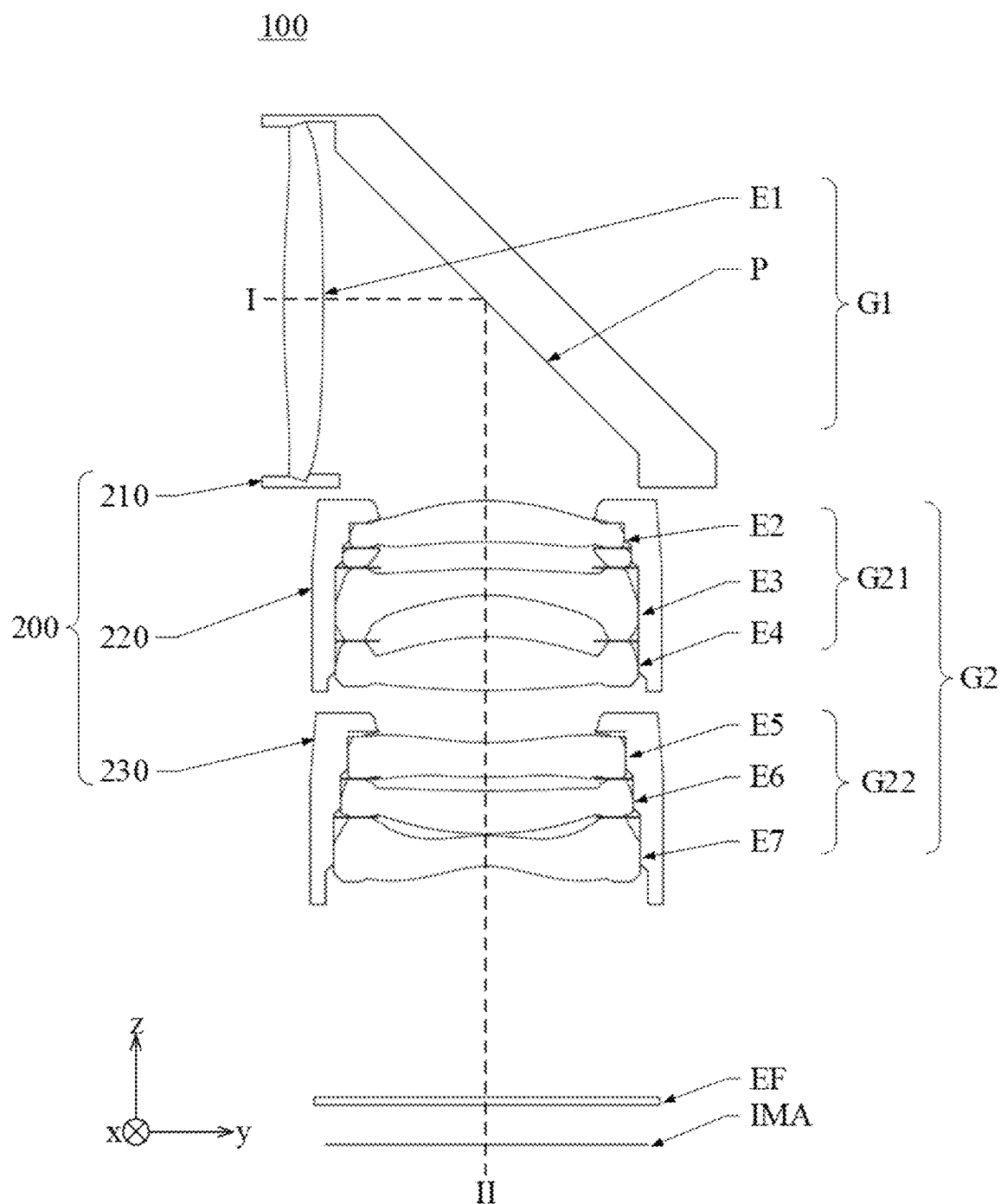
FIG. 6 shows a schematic structural diagram of an optical system including a lens barrel assembly according to still another embodiment of the disclosure.

FIG. 6 shows a schematic structural diagram of an optical system including a lens barrel assembly according to an embodiment of the disclosure.

In the embodiment, as shown in FIG. 6, the optical system 100 includes a lens barrel assembly 200. The lens barrel assembly 200 includes a first lens barrel 210, a second lens barrel 220 and a third lens barrel 230. The first element group G1 is fixed in the first lens barrel 210. The first lens group G21 is fixed in the second lens barrel 220. The second lens group G22 is fixed in the third lens barrel 230. The first lens barrel 210 has a first opening located at a light incident side and a second opening located at a light emergent side, the first lens E1 is arranged in the first opening, and the reflective element P is arranged between the first opening and the second opening. The inner diameters of portions corresponding to different lenses of the second lens barrel 220 are different. The inner diameters of portions corresponding to different lenses of the third lens barrel 230 are different.

During the anti-shaking process of the optical system 100, the first lens barrel 210 is able to drive the first element group G1 arranged therein to rotate around the z direction.

During the focusing process of the optical system 100, the third lens barrel 230 is able to drive the second lens group G22 arranged therein to move along the optical axis II. In an embodiment, when the distance from the photographed object to the optical system 100 changes from far to near, the third lens barrel 230 is able to drive the second lens group G22 arranged therein to move towards the image side (In an embodiment, the image plane IMA) along the optical axis II. When the distance from the photographed object to the optical system 100 changes from near to far, the third lens barrel 230 is able to drive the second lens group G22 arranged therein to move towards the first lens group G21 along the optical axis II.

In an embodiment, during the anti-shaking or the focusing process, or the anti-shaking and the focusing process of the optical system 100, the first lens barrel 210 and the first element group G1 arranged therein are driven by a first motor (not shown), and the third lens barrel 230 and the second lens group G22 arranged therein are driven by a third motor (not shown). In addition, the position of the image plane IMA remains fixed.

In an embodiment, as shown in FIGS. 1, 3 and 5, the optical system 100 satisfies: 0.1<tan (FOV/2)<0.23, where the FOV is the maximum field of view of the optical system 100. By reasonably configuring a tangent value of half of the maximum field of view of the optical system 100, the optical system 100 may have a relatively small field of view, which helps to balance imaging of a photographed object at a long distance and a short distance by the optical system 100, so as to ensure that the optical system 100 has good imaging quality at both the long distance and the short distance.

In an embodiment, as shown in FIGS. 1, 3 and 5, the optical system 100 satisfies: 4.0<D1/CT1<4.7, where the D1 is the maximum effective half-aperture of the first lens E1, and the CT1 is the center thickness of the first lens E1 on the optical axis I. In an embodiment, the D1 is the maximum value among an effective half-aperture of the object-side surface of the first lens E1 in the x direction, an effective half-aperture of the object-side surface of the first lens E1 in the z direction, an effective half-aperture of the image-side surface of the first lens E1 in the x direction, and an effective half-aperture of the image-side surface of the first lens E1 in the z direction. The ratio of the maximum effective half-aperture D1 of the first lens E1 to the center thickness CT1 of the first lens E1 is reasonably configured, so that when the processability requirement of the first lens E1 is satisfied, the structure of the optical system 100 may be compact, which helps to shorten the total height of the optical system and also helps to improve the effective aperture of the optical system 100. In addition, constraining the center thickness of the first lens E1 within a reasonable range is able to reduce the length of an optical path, thereby reducing aberrations caused by light refraction. If the thickness of the lens is too large, the path of a light ray passing through the lens may be increased, which may cause more optical distortion, thereby not being beneficial to improve the imaging quality.

In an embodiment, as shown in FIGS. 1, 3 and 5, the optical system 100 satisfies: 1.9<|f1/EFL|<3.0, where the f1 is the effective focal length of the first lens E1, and the EFL is the effective focal length of the optical system 100. By reasonably configuring the ratio of the effective focal length of the first lens E1 to the effective focal length of the optical system 100, the first lens E1 may have a convergence capacity, so as to achieve a convergence effect on light rays, and contribute to shortening the shoulder height. In addition, the first lens E1 having the light convergence capability may also function to enlarge the aperture. If the described constraint condition of the optical system 100 is less than the maximum value, the aperture value of the optical system 100 may be effectively reduced, thereby functioning to enlarge the aperture; and if the described constraint condition of the optical system 100 is greater than the minimum value, the processing difficulty of the first lens E1 may be reduced. In other words, if the optical system 100 satisfies the described constraint condition, a balance between a small aperture value and the processability of the first lens E1 may be achieved. Since an optical system in a conventional periscope camera module has a smaller aperture, the imaging effect may be worse due to shaking occurring during night scene or video photographing. When the optical system 100 satisfies: 1.9<|f1/EFL|<3.0, during an anti-shaking process, the position of the image plane of the optical system 100 remains fixed, and the first lens E1 and the reflective element P rotate together around a direction parallel to the second optical axis. This not only allows the first lens E1 to have a convergence capability, so as to converge light rays to contribute to enlarging an aperture and shortening a shoulder height, but also helps to correct rotation and shaking of a camera module generated in a low-light environment and during video photographing, thereby being beneficial to improving the performance of a device in night scene photographing and video photographing, and further satisfying wider usage requirements.

In an embodiment, as shown in FIGS. 1, 3 and 5, the second element group G2 includes a movable lens group, such as the second element group G2 shown in FIG. 3 or the second lens group G22 shown in FIG. 5. The optical system 100 satisfies: $0.7<|FG2_m/EFL|<1.3$, where the $FG2_m$ is the effective focal length of the movable lens group, and the EFL is the effective focal length of the optical system 100. In an embodiment, in the case where the second element group G2 serves as the movable lens group, the optical system 100 satisfies: $1.2<|FG2_m/EFL|<1.3$. In another embodiment, in the case where the second lens group G22 in the second element group G2 serves as the movable lens group, the optical system 100 satisfies: $0.7<|FG2_m/EFL|<0.8$. When the optical system 100 photographs objects at different object distances, the ratio of the effective focal length of the movable lens group in the second element group G2 to the effective focal length of the optical system 100 is reasonably configured, so that it is able to be ensured that a focusing function is realized by means of the movement of the movable lens group, and it is also able to be ensured that the optical system 100 has good imaging performance at different object distances, thereby helping to expand the range of imageable object distances of the optical system 100. In addition, when the optical system 100 shown in FIG. 5 satisfies the described constraint condition, the first lens group G21 in the second element group G2 is able to serve as a link between the preceding and following elements, so that light rays emitted from the first element group G1 smoothly enter the second lens group G22 (i.e. the movable lens group), thereby correcting aberrations to improve the imaging quality.

When the optical system 100 satisfies: $0.7<|FG2_m/EFL|<1.3$, during an anti-shaking process, the position of the image plane of the optical system 100 remains fixed, and the first lens E1 and the reflective element P rotate together around a direction parallel to the second optical axis. In this way, when shaking occurs, the optical system 100 is able to ensure that a focusing function is realized by means of the movement of the movable lens group, and it is also able to be ensured that the optical system 100 has good imaging performance at different object distances, thereby helping to expand the range of imageable object distances of the optical system 100. Further, aberrations may also be corrected during the anti-shaking process, ensuring that a high-quality image may be obtained even under a shaking condition.

In an embodiment, as shown in FIGS. 1, 3 and 5, the second element group G2 includes a movable lens group, such as the second element group G2 shown in FIG. 3 or the second lens group G22 shown in FIG. 5. The optical system 100 satisfies: $2.2<|f1/FG2_m|<2.6$, where f1 is the effective focal length of the first lens E1, and $FG2_m$ is the effective focal length of the movable lens group. In an embodiment, in the case where the second element group G2 serves as the movable lens group, the optical system 100 satisfies: $2.2<|f1/FG2_m|<2.4$. In another embodiment, in the case where the second lens group G22 in the second element group G2 serves as the movable lens group, the optical system 100 satisfies: $2.4<|f1/FG2_m|<2.6$. By reasonably configuring the ratio of the effective focal length of the first lens E1 to the effective focal length of the movable lens group in the second element group G2, light rays emitted from the first element group G1 are able to transit smoothly in the movable lens group, contributing to improving the imaging quality of the optical system 100. In addition, it helps to control aberrations generated by the first element group G1, so that the movable lens group has a strong effect on aberration correction, and thus the optical system 100 has good imaging quality. Moreover, it also helps to reduce the movement travel of the movable lens, so that the volume of a motor for driving the movable lens group is able to be reduced. When the optical system 100 is applied to a camera module (including a motor), the camera module has a more compact structure. For example, if the ratio of the effective focal length of the first lens E1 to the effective focal length of the movable lens group in the second element group G2 is less than 2.2, the movable lens group may need to have a larger effective focal length, thereby causing the movable lens group to have a larger movement travel (i.e. the driving travel of the motor), which is not beneficial to reduce the volume of the motor. If the ratio of the effective focal length of the first lens E1 to the effective focal length of the movable lens group in the second element group G2 is greater than 2.6, light rays emitted from the first element group G1 may not smoothly transit to the movable lens group, which is not beneficial to improve the imaging quality. In addition, if the ratio is greater than 2.6, the first lens E1 may need to have a large effective focal length, which is not beneficial to implement the processability of the first lens E1.

Therefore, if the optical system 100 satisfies the described constraint condition, it is also able to satisfy the design requirements of imaging quality, the processability of the first lens, and the movement travel of the movable lens group.

When the optical system 100 satisfies: $2.2<|f1/FG2_m|<2.6$, during an anti-shaking process, the position of the image plane of the optical system 100 remains fixed, and the first lens E1 and the reflective element P rotate together around a direction parallel to the second optical axis. In this way, when shaking occurs, the optical system 100 enables light rays emitted from the first element group G1 to smoothly transits in the movable lens group, contributing to improving the imaging quality of the optical system 100. Further, aberrations generated by the first element group G1 is also able to be controlled during the anti-shaking process, so that the movable lens group has a strong effect on aberration correction, and thus the optical system 100 is also able to obtain a high-quality image even under a shaking condition.

In an embodiment, as shown in FIGS. 1, 3 and 5, the optical system 100 satisfies: $0.9<|f1/FG2|<2.5$, where the f1 is the effective focal length of the first lens, and the FG2 is the effective focal length of the second element group. In an embodiment, in the case where the second element group G2 serves as the movable lens group, the optical system 100 satisfies: $2.2<|f1/FG2|<2.4$. In another embodiment, in the case where the second lens group G22 in the second element group G2 serves as the movable lens group, the optical system 100 satisfies: $0.9<|f1/FG2|<1.0$. By reasonably configuring the ratio of the effective focal length of the first lens E1 to the effective focal length of the second element group G2, the first lens E1 is able to have a strong light convergence capacity and a strong aperture enlarging effect. In addition, light rays emitted from the first element group G1 are able to transit smoothly in the second lens group G22, contributing to improving the imaging quality of the optical system 100.

In an embodiment, as shown in FIGS. 1, 3 and 5, the optical system 100 satisfies: $0.6<EFL/SL<0.9$, where the EFL is the effective focal length of the optical system 100, and the SL is the total length of the optical system 100 on the optical axis II. By reasonably configuring the ratio of the effective focal length of the optical system 100 to the total length of the optical system 100, the optical system 100 is able to have a telephoto characteristic, and at the same time, the total length of the optical system 100 is also able to be shortened. In addition, if the optical system 100 satisfies the described constraint condition, the balance between design requirements in multiple aspects, such as imaging quality, size and cost, may be achieved.

When the optical system 100 satisfies: 0.9<|f1/FG2|<2.5, during an anti-shaking process, the position of the image plane of the optical system 100 remains fixed, and the first lens E1 and the reflective element P rotate together around a direction parallel to the second optical axis. In this way, the first lens E1 has a strong light convergence capability and a strong aperture enlarging effect. This also helps to correct rotation and shaking of a camera module generated in a low-light environment and during video photographing, thereby being beneficial to improving the performance of a device in night scene photographing and video photographing, and further satisfying wider usage requirements. When shaking occurs, the optical system 100 enables light rays emitted from the first element group G1 to smoothly transits in the second lens group G22, so that the optical system 100 is also able to obtain a high-quality image even under a shaking condition.

In an embodiment, as shown in FIGS. 1, 3 and 5, the optical system 100 satisfies: 3.2<SL/EPD<3.5. SL is the total length of the optical system 100 on the optical axis II, and EPD is the entrance pupil diameter of the optical system 100. The entrance pupil diameter is able to affect the aperture size of the optical system 100. By reasonably configuring the ratio of the total length of the optical system 100 to the entrance pupil diameter thereof, the optical system 100 is able to have a large aperture characteristic, and at the same time, the total length of the optical system 100 is able to also be shortened. If the optical system 100 satisfies the described constraint condition, the balance between the aperture and the design size and weight of the optical system 100 is able to be achieved. If the optical system 100 does not satisfy the described constraint condition, the optical system 100 is too bulky or oversize, which is not beneficial to the miniaturization of the optical system 100.

When the optical system 100 satisfies: 3.2<SL/EPD<3.5, during an anti-shaking process, the position of the image plane of the optical system 100 remains fixed, and the first lens E1 and the reflective element P rotate together around a direction parallel to the second optical axis. In this way, the optical system 100 is able to have a large aperture characteristic, and at the same time, the total length of the optical system 100 is able to also be shortened. This also helps to correct rotation and shaking of a camera module generated in a low-light environment and during video photographing, thereby being beneficial to improving the performance of a device in night scene photographing and video photographing, and further satisfying wider usage requirements.

In an embodiment, as shown in FIGS. 1, 3 and 5, the optical system 100 satisfies: 0.7<GH/EPD<0.9. The GH is the shoulder height of the optical system 100, and the EPD is the entrance pupil diameter of the optical system 100. By reasonably configuring the ratio of the shoulder height of the optical system 100 to the entrance pupil diameter thereof, the optical system 100 is able to have a large aperture characteristic, and at the same time, the shoulder height of the optical system 100 is also able to be shortened. Specifically, the shoulder height needs to match the effective aperture (for example, the physical aperture of the diaphragm STO) to ensure that light rays are able to propagate efficiently in the optical system 100 without causing obstruction or loss. The size of the effective aperture and the position thereof may affect the propagation of light rays, and the design of shoulder height needs to ensure that the light rays are able to optimally pass through, for example, the second element group G2. The optical system 100 satisfied the described constraint condition is able to reduce the aberration of the optical system 100, and especially for an optical system (in the disclosure, the optical system 100) having a telephoto characteristic or a large aperture characteristic, the imaging quality is able to be improved more significantly. In addition, by limiting the aperture within a reasonable range, the contribution of marginal rays to the aberration is able to be reduced, so that the effect caused by inclination of the reflective element P is able to be compensated for to a certain extent.

When the optical system 100 satisfies: 0.7<GH/EPD<0.9, during an anti-shaking process, the position of the image plane of the optical system 100 remains fixed, and the first lens E1 and the reflective element P rotate together around a direction parallel to the second optical axis. In this way, the optical system 100 is able to have a large aperture characteristic, and at the same time, the shoulder height of the optical system 100 is also able to be shortened. This also helps to correct rotation and shaking of a camera module generated in a low-light environment and during video photographing, thereby being beneficial to improving the performance of a device in night scene photographing and video photographing, and further satisfying wider usage requirements.

In an embodiment, as shown in FIGS. 1, 3 and 5, the optical system 100 satisfies: 1.0<SH/EPD<1.15. The SH is the total height of the optical system 100, and the EPD is the entrance pupil diameter of the optical system 100. By reasonably configuring the ratio of the total height of the optical system 100 to the entrance pupil diameter thereof, the optical system 100 is able to have a large aperture characteristic, and at the same time, the total height of the optical system 100 is also able to be shortened. The effective balance between the total height of the optical system 100 and the entrance pupil diameter thereof may not only ensure that the optical system 100 has good optical performance, but also ensure that the optical system 100 is not too bulky or "top-heavy", which facilitates the compact structure of the optical system 100 and improvement of the space utilization rate. If the optical system 100 satisfies the minimum value of the described constraint condition, it is able to be ensured that the total height has a sufficient design size, thereby ensuring an accommodation space of the effective aperture (in an embodiment, the diaphragm STO), and thus allowing smooth propagation of light rays. On the other hand, if the optical system 100 satisfies the maximum value of the described constraint condition, the compact structure of the optical system 100 is able to be ensured. In short, the optical system 100 satisfied the described constraint condition is able to be achieve the balance between a small total height and a large aperture.

In an embodiment, as shown in FIGS. 1, 3 and 5, the optical system 100 satisfies: 0.1<ImgH/EFL<0.3. The ImgH is half of the diagonal length of an effective pixel area on the image plane IMA, and the EFL is the effective focal length of the optical system. The ratio of half of the diagonal length of an effective pixel area on the image plane IMA to the effective focal length of the optical system 100 is reasonably configured, which helps to ensure that the optical system 100 has a relatively large image plane to present more information of a photographed object while having a telephoto characteristic.

In an embodiment, as shown in FIGS. 1, 3 and 5, the optical system 100 satisfies: OBJmin≥30 cm. In an embodiment, the object distance is the distance between a photographed object and the optical system 100. The optical system 100 satisfied the described constraint condition is able to ensure that the photographed object has a good imaging effect at both a short distance and a long distance.

Figure 7:
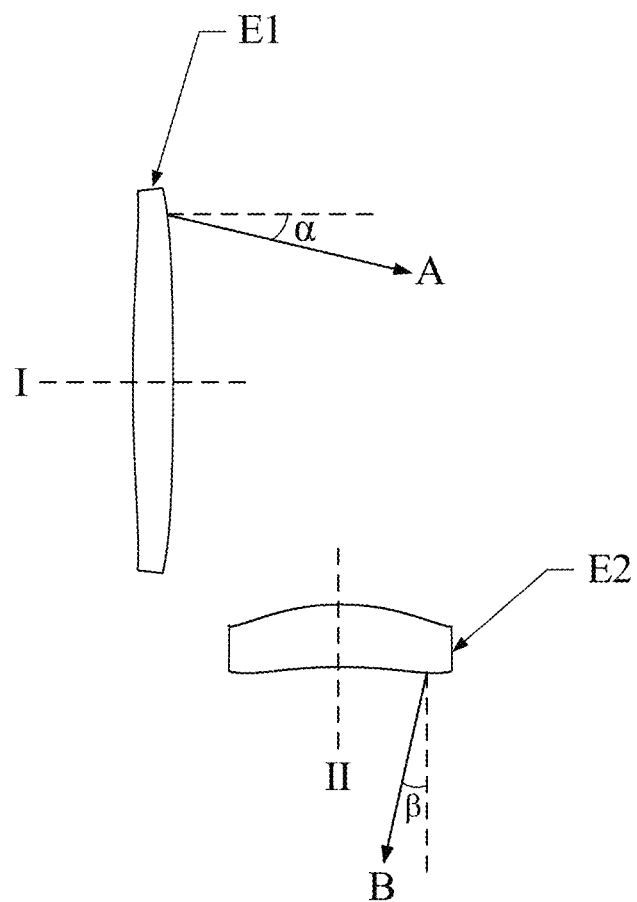
FIG. 7 shows schematic optical path diagrams of a first lens and a second lens of an optical system according to an embodiment of the disclosure.

In an embodiment, FIG. 7 shows schematic optical path diagrams of a first lens E1 and a second lens E2. As shown in FIGS. 1, 3, 5 and 7, as described above, the second lens E2 is an element closest to the reflective element P in the second element group G2. The optical system 100 satisfies: 1.5<tan β/tan α<1.8. The α is the angle between a marginal ray of a central field of view after passing through the first lens E1 and the optical axis I, and the β is the angle between a marginal ray of a central field of view after passing through the second lens E2 and the optical axis II. By reasonably configuring the ratio of the angle α to the angle β, it is able to be ensured that the marginal rays are constrained before and after being folded by the reflective element P, thereby ensuring that the reflective element P may not affect parameters such as illumination and CRA.

When the optical system 100 satisfies: 1.5<tan β/tan α<1.8, during an anti-shaking process, the position of the image plane of the optical system 100 remains fixed, and the first lens E1 and the reflective element P rotate together around a direction parallel to the second optical axis. In this way, it is able to be ensured that the marginal rays are constrained before and after being folded by the reflective element P, thereby ensuring that the reflective element P may not affect parameters such as illumination and CRA. This also helps to correct rotation and shaking of a camera module generated in a low-light environment and during video photographing, thereby being beneficial to improving the performance of a device in night scene photographing and video photographing, and further satisfying wider usage requirements.

In an embodiment, as shown in FIGS. 1, 3 and 5, the optical system 100 satisfies: 1.4<L1S1R/EFL<1.6. The L1S1R is the radius of curvature of an object-side surface of the first lens, and the EFL is the effective focal length of the optical system 100. The ratio of the radius of curvature of the object-side surface of the first lens E1 to the effective focal length of the optical system 100 is reasonably configured, which helps to balance the light-gathering performance and the optical anti-shaking performance.

If the described constraint condition of the optical system 100 is greater than the maximum value, the radius of curvature of the object-side surface of the first lens E1 may be large, so that the light focusing capability of the first lens E1 reduces, and the light-gathering effect of the incident surface (i.e. the object-side surface) of the first lens E1 is not ideal. At the same time, an excessive radius of curvature of the object-side surface of the first lens E1 may cause the first lens E1 to have a larger size, which may cause the optical system 100 to be bulky. In addition, an excessive radius of curvature may also limit optimization and matching of other lenses, resulting in reduced design flexibility. If the described constraint condition of the optical system 100 is less than the minimum value, the radius of curvature of the object-side surface of the first lens E1 may be small, which may cause great difficulty in processing the incident surface (i.e. the object-side surface) of the first lens E1.

On the other hand, if the object-side surface of the first lens E1 has a suitable curvature radius, it helps to reduce the aberration generated by displacement of the light rays due to shaking, thereby improving the imaging quality. If the L1S1R is large, the light may be displaced greatly during the anti-shaking process. Therefore, for an appropriate L1S1R, during the shaking process, the position of the image plane of the optical system 100 remains fixed, and the first lens E1 and the reflective element P rotate together around a direction parallel to the second optical axis, which helps to improve the anti-shaking stability. In addition, constraining the L1S1R within a reasonable range enables light rays to pass relatively parallel through the first lens E1, thereby contributing to reducing aberrations, and further contributing to improving the imaging quality.

In an embodiment, as shown in FIGS. 1, 3 and 5, the optical system 100 satisfies: 0.8<|L2S2R/EFL|<2.4. The L2S2R is the radius of curvature of an image-side surface of the second lens E2, and the EFL is the effective focal length of the optical system 100. As described above, the second lens E2 is able to be an element closest to the reflective element P in the second element group G2. The ratio of the radius of curvature of the image-side surface of the second lens E2 to the effective focal length of the optical system 100 is reasonably configured, which helps to balance the imaging quality and the optical anti-shaking performance.

If the described constraint condition of the optical system 100 is greater than the maximum value, the radius of curvature of the image-side surface of the second lens E2 may be large, so that the light focusing capability of the second lens E2 is poor, thereby affecting aberration correction. If the described constraint condition of the optical system 100 is less than the minimum value, the radius of curvature of the image-side surface of the second lens E2 may be small, which may cause great difficulty in processing the image-side surface of the second lens E2, and may also affect the aberration compensation effect.

In addition, the image-side surface of the second lens E2 has a suitable radius of curvature, and during the shaking process, the position of the image plane of the optical system 100 remains fixed, and the first lens E1 and the reflective element P rotate together around a direction parallel to the second optical axis, which is also able to reduce the effect of aberrations caused by light rays due to shaking, thereby contributing to effectively correcting the aberrations.

In the disclosure, the SL represents the total length of the optical system 100 in the direction of the optical axis II, and specifically, the SL is the spacing distance between the first lens E1 and the image plane IMA on the optical axis II. The GH represents the shoulder height of a rear element group (in an embodiment, the second element group G2), and specifically, the GH is determined by a maximum half-aperture of lenses in the second element group G2 in the y direction. The SH represents the total height of the optical system 100, and specifically, the SH is the total height of the optical system 100 in the y direction.

A person skilled in the art should understand that various results and advantages described in this description are able to be obtained by changing the number of lenses constituting the optical system 100 without departing from the claimed technical solutions of the disclosure.

Specific embodiments of an optical system applicable to the described embodiments are further described below with reference to the accompanying drawings.

Embodiment 1

Figure 8:
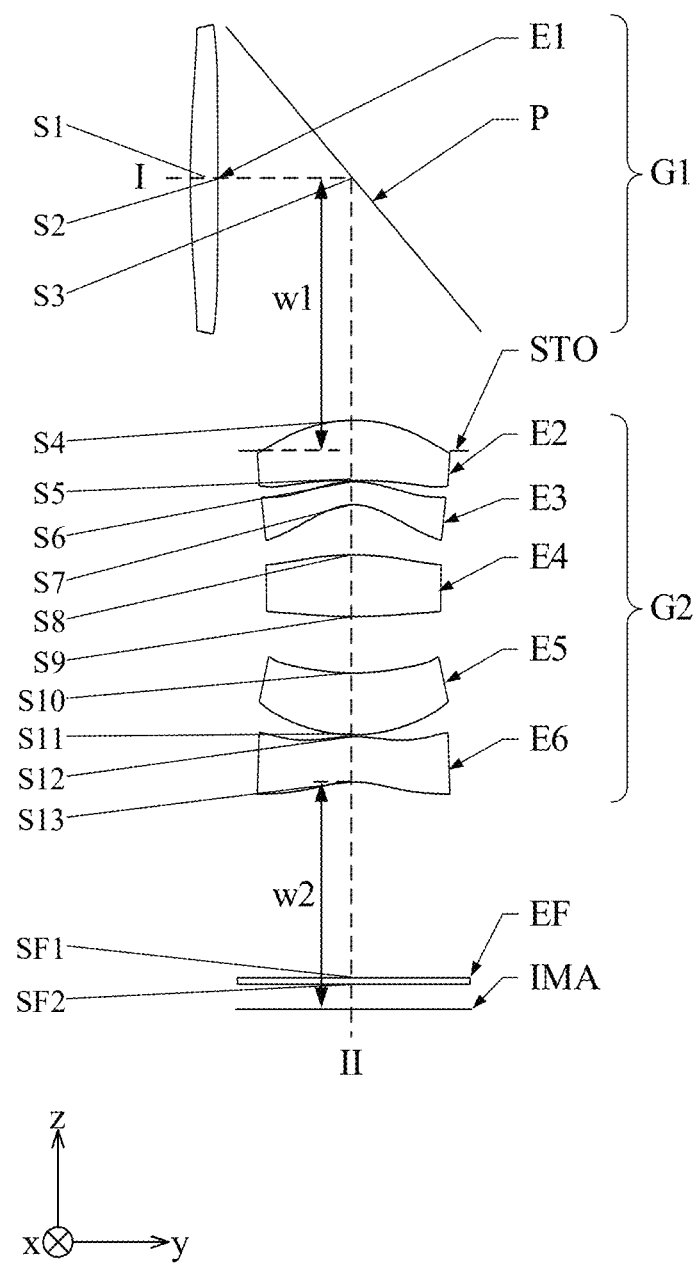
FIG. 8 shows a schematic structural diagram of an optical system according to Embodiment 1 of the disclosure.

The optical system according to Embodiment 1 is described below with reference to FIGS. 8, 9, 10 and 11. FIG. 8 shows a schematic structural diagram of an optical system according to Embodiment 1 of the disclosure.

As shown in FIG. 8, the optical system 100 includes a first element group G1 and a second element group G2 sequentially arranged from an object side to an image side. The image side is provided with an image plane IMA. In the embodiment, the imageable object distance of the optical system 100 ranges from 30 cm to infinity.

The first element group G1 includes a first lens E1, and a reflective element P. The second element group G2 includes a second lens E2, a third lens E3, a fourth lens E4, a fifth lens E5, and a sixth lens E6. The first lens E1 is located on an optical axis I and provided between the object side and a reflective element P. The second lens E2, the third lens E3, the fourth lens E4, the fifth lens E5, and the sixth lens E6 are sequentially arranged from the reflective element P to the image side along an optical axis II. The image plane IMA is located on the optical axis II. A filter EF is provided between the sixth lens E6 and the image plane IMA. A diaphragm STO is provided between the reflective element P and the second lens E2.

The first lens E1 has a positive refractive power, and an object-side surface S1 thereof is a convex surface and an image-side surface S2 thereof is a convex surface. The reflective element P has a reflective surface S3, and the reflective surface S3 is a planar surface. The second lens E2 has a positive refractive power, and an object-side surface S4 thereof is a convex surface and an image-side surface S5 thereof is a concave surface. The third lens E3 has a negative refractive power, and an object-side surface S6 thereof is a convex surface and an image-side surface S7 thereof is a concave surface. The fourth lens E4 has a positive refractive power, and an object-side surface S8 thereof is a convex surface and an image-side surface S9 thereof is a convex surface. The fifth lens E5 has a positive refractive power, and an object-side surface S10 thereof is a concave surface and an image-side surface S11 thereof is a convex surface. The sixth lens E6 has a negative refractive power, and an object-side surface S12 thereof is a convex surface and an image-side surface S13 thereof is a concave surface. The filter EF has an object-side surface SF1 and an image-side surface SF2. Light from an object sequentially passes through the respective surfaces S1 to SF2 and is finally imaged on the image plane IMA.

Table 1 shows basic parameters of the optical system 100 according to Embodiment 1. The units of radius of curvature, and thickness/distance are all millimeters (mm). In this embodiment, the positive or negative sign of the numerical value of the radius of curvature of each surface indicates the direction of curvature of the surface. When the directions of curvature of the surfaces of lenses on the optical axis I and the optical axis II are the same, the signs of the numerical values of the radii of curvature of the surfaces have opposite positive and negative attributes. Likewise, the positive or negative sign of the numerical value of the thickness/distance of each surface only indicates the direction.

TABLE 1

| Surface number | Element | Surface shape | Radius of curvature | Thickness/ distance | Material | Refractive index | Abbe number | Focal length |
|---|---|---|---|---|---|---|---|---|
| S1 | First lens | Aspheric surface | 32.2985 | 1.0576 | Plastic | 1.516 | 56.999 | 60.55 |
| S2 | | Aspheric surface | −1053.9962 | 5.2656 | | | | |
| S3 | Reflective element | Spherical surface | Infinity | w1 | | | | |
| STO | Diaphragm | Spherical surface | Infinity | 0.9837 | | | | |
| S4 | Second lens | Aspheric surface | −6.8046 | −1.9496 | Plastic | 1.516 | 56.999 | 14.95 |
| S5 | | Aspheric surface | −50.8118 | −0.0400 | | | | |
| S6 | Third lens | Aspheric surface | −4.2374 | −0.7500 | Plastic | 1.638 | 23.461 | −10.30 |
| S7 | | Aspheric surface | −2.4056 | −1.6237 | | | | |
| S8 | Fourth lens | Aspheric surface | −12.7116 | −2.0000 | Plastic | 1.526 | 56.629 | 16.19 |
| S9 | | Aspheric surface | 24.6075 | −1.8321 | | | | |
| S10 | Fifth lens | Aspheric surface | 8.6652 | −2.0000 | Plastic | 1.671 | 19.400 | 39.02 |
| S11 | | Aspheric surface | 7.1349 | −0.0600 | | | | |
| S12 | Sixth lens | Aspheric surface | −6.4199 | −1.4677 | Plastic | 1.568 | 32.293 | −35.08 |
| S13 | | Aspheric surface | −4.4580 | w2 | | | | |
| SF1 | Filter | Spherical surface | Infinity | −0.2100 | Glass | 1.517 | 64.210 | |
| SF2 | | Spherical surface | Infinity | −0.8095 | | | | |
| IMA | Image plane | Spherical surface | Infinity | | | | | |

As shown in FIG. 8, during the anti-shaking process of the optical system 100, the position of the image plane IMA remains fixed, and the first element group G1 rotates around the z direction.

During the focusing process of the optical system 100, the position of the image plane IMA remains fixed, the position of the first element group G1 remains fixed, and the second element group G2 moves along the optical axis II, so that the distance between the first element group G1 and the second element group G2 (in the embodiment, between the reflective element P and the second lens E2) is adjustable. When the distance from the photographed object to the optical system 100 changes from far to near, the second element group G2 is able to move towards the reflective element P along the optical axis II, i.e. reducing the distance between the second element group G2 and the reflective element P on the optical axis II. When the distance from the photographed object to the optical system 100 changes from near to far, the second element group G2 is able to move towards the image side (in the embodiment, the image plane IMA) along the optical axis II, i.e. increasing the distance between the second element group G2 and the reflective element P on the optical axis II. In the optical system 100, the second element group G2 serves as a movable lens group for compensation.

During the movement of the second element group G2, the distance w1 between the reflective surface S3 of the reflective element P and the diaphragm STO on the optical axis II, and the distance w2 between the image-side surface S13 of the sixth lens E6 and the object-side surface SF1 of the filter EF on the optical axis II are variable. When the distance between the photographed object and the optical system 100 is infinity, the w1 is equal to −8.7923 mm, and the w2 is equal to −6.3484 mm. When the distance between the photographed object and the optical system 100 is 30 cm, the w1 is equal to −7.0837 mm, and the w2 is equal to −8.0570 mm.

In this embodiment, the object-side surface and the image-side surface of any one of the first lens E1 to the sixth lens E6 are aspheric surfaces, and the surface shape of each aspheric lens is able to be defined by, but not limited to, the following Aspheric formula:

$$X(Y) = \frac{(Y^2/R)}{1 + \sqrt{1 - (1+K)\cdot(Y^2/R^2)}} + \sum A_i Y^i \quad (1)$$

where the X(Y) represents a relative distance between a point, which is away from the optical axis by Y on the aspheric surface and a tangent plane at the intersection point on the optical axis of the aspheric surface; the Y represents a perpendicular distance between a point on the aspheric curve and the optical axis; the R represents a radius of curvature; the K represents a conic coefficient; and the Ai represents an ith-order aspheric coefficient. Table 2 provides conic coefficients K and high-order term coefficients $A_4$, $A_6$, $A_8$, $A_{10}$, $A_{12}$, $A_{14}$ and $A_{16}$ that is able to be applied to the respective aspheric surfaces S1-S2 and S4-S13 in Embodiment 1.

sequentially arranged from an object side to an image side. The image side is provided with an image plane IMA. In the embodiment, the imageable object distance of the optical system 100 ranges from 40 cm to infinity.

The first element group G1 includes a first lens E1, and a reflective element P. The second element group G2 includes a second lens E2, a third lens E3, a fourth lens E4, a fifth lens E5, and a sixth lens E6. In the embodiment, the first lens E1 is located on an optical axis I and provided between the object side and a reflective element P. The second lens E2, the third lens E3, the fourth lens E4, the fifth lens E5, and the sixth lens E6 are sequentially arranged from the reflective element P to the image side along an optical axis II. The image plane IMA is located on the optical axis II. A filter EF is provided between the sixth lens E6 and the image plane IMA. A diaphragm STO is provided between the reflective element P and the second lens E2.

The first lens E1 has a positive refractive power, and an object-side surface S1 thereof is a convex surface and an image-side surface S2 thereof is a convex surface. The reflective element P has a reflective surface S3, and the

TABLE 2

| Surface number | K | $A_4$ | $A_6$ | $A_8$ | $A_{10}$ | $A_{12}$ | $A_{14}$ | $A_{16}$ |
|---|---|---|---|---|---|---|---|---|
| S1 | −24.931 | −6.50E−02 | −1.80E−02 | −1.00E−03 | 0.00E+00 | 0.00E+00 | 0.00E+00 | 0.00E+00 |
| S2 | −39.687 | −1.16E−01 | −1.70E−02 | −1.00E−03 | 0.00E+00 | 0.00E+00 | 0.00E+00 | 0.00E+00 |
| S4 | −12.650 | −4.98E−01 | 8.60E−02 | −1.00E−03 | 4.00E−03 | 0.00E+00 | 0.00E+00 | 0.00E+00 |
| S5 | 90.000 | −1.39E−01 | 1.17E−01 | −9.00E−03 | 2.00E−03 | −2.00E−03 | 0.00E+00 | −1.00E−03 |
| S6 | −1.837 | 8.97E−01 | −7.40E−02 | 6.00E−03 | −3.00E−03 | −1.00E−03 | 0.00E+00 | 0.00E+00 |
| S7 | −3.064 | 3.13E−01 | 1.00E−02 | −6.00E−03 | −1.00E−03 | −1.00E−03 | 0.00E+00 | 0.00E+00 |
| S8 | −22.830 | −5.00E−03 | 3.20E−02 | −1.00E−03 | −4.00E−03 | −1.00E−03 | 0.00E+00 | 0.00E+00 |
| S9 | 43.172 | −1.44E−01 | −1.20E−02 | 0.00E+00 | −2.00E−03 | −1.00E−03 | 0.00E+00 | 0.00E+00 |
| S10 | 3.182 | −3.01E−01 | 6.90E−02 | 2.00E−03 | 4.00E−03 | −1.00E−03 | 0.00E+00 | 0.00E+00 |
| S11 | 2.235 | −2.45E−01 | −4.00E−02 | 0.00E+00 | −8.00E−03 | −1.00E−03 | 0.00E+00 | 0.00E+00 |
| S12 | −0.001 | 1.48E+00 | −2.17E−01 | 2.40E−02 | −8.00E−03 | 1.00E−03 | 0.00E+00 | 0.00E+00 |
| S13 | −3.225 | 9.44E−01 | −1.58E−01 | 2.30E−02 | −6.00E−03 | 1.00E−03 | 0.00E+00 | 0.00E+00 |

Figure 9:
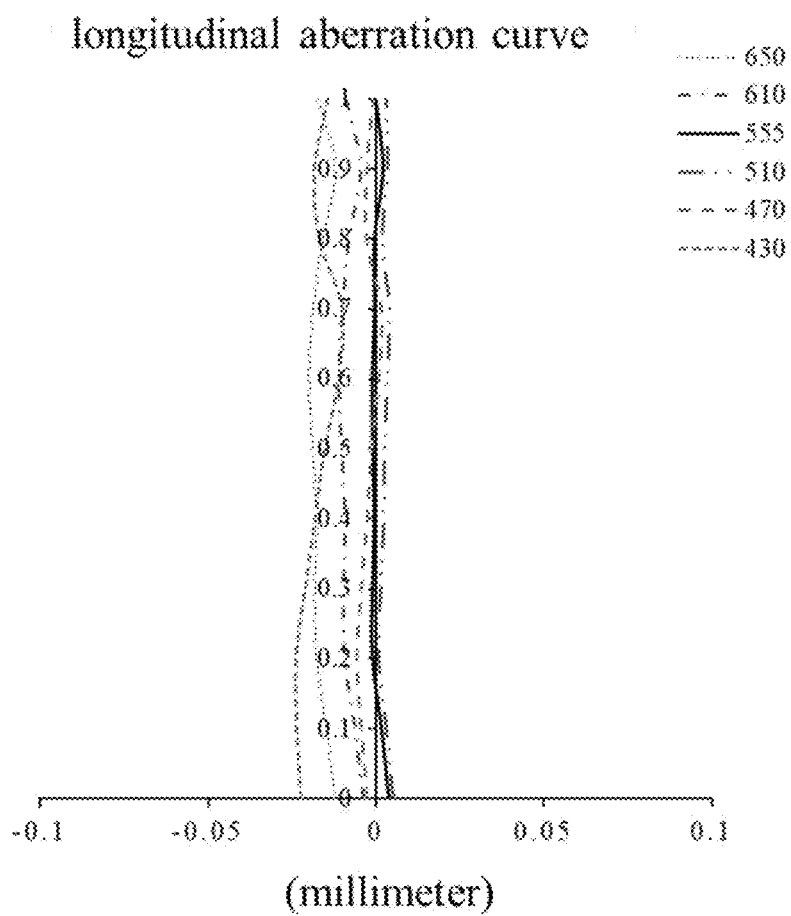
FIG. 9, FIG. 10 and FIG. 11 respectively show a longitudinal aberration curve, an astigmatism curve and a distortion curve of an optical system according to Embodiment 1 of the disclosure.
Figure 10:
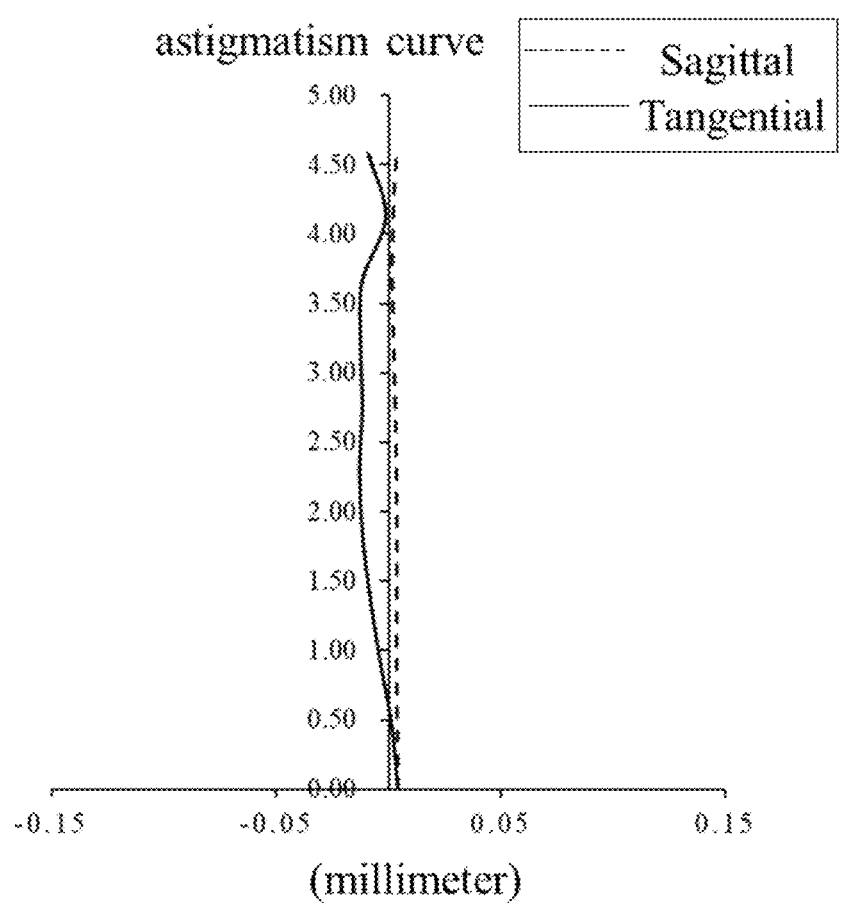
Figure 11:
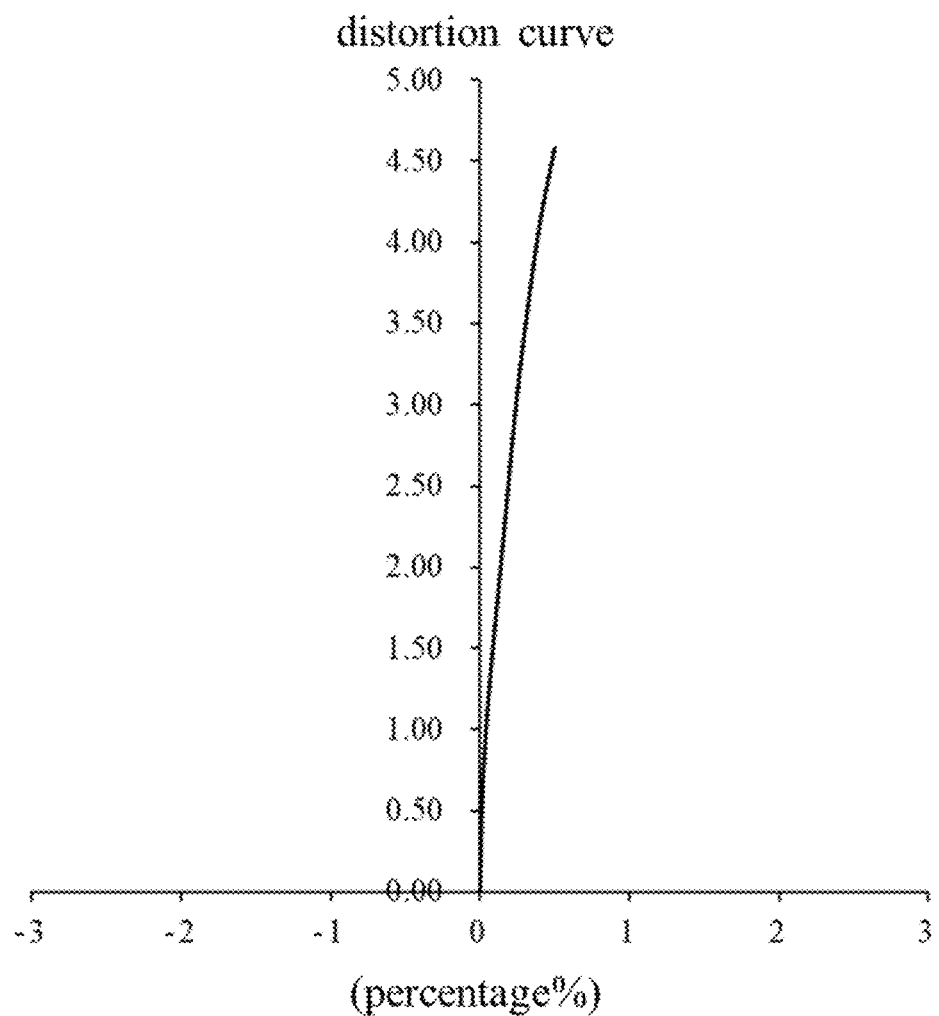

FIG. 9 shows a longitudinal aberration curve of the optical system 100 according to Embodiment 1, which represents the deviation of a convergent focal point of light rays of different wavelengths after passing through the optical system 100. FIG. 10 shows an astigmatism curve of the optical system 100 according to Embodiment 1, which represents the tangential image plane curvature and the sagittal image plane curvature corresponding to different image heights. FIG. 11 shows a distortion curve of the optical system 100 according to Embodiment 1, which represents the distortion magnitude values corresponding to different image heights. It is able to be determined from FIGS. 9, 10 and 11 that the optical system 100 according to Embodiment 1 is able to achieve good imaging quality.

Embodiment 2

Figure 12:
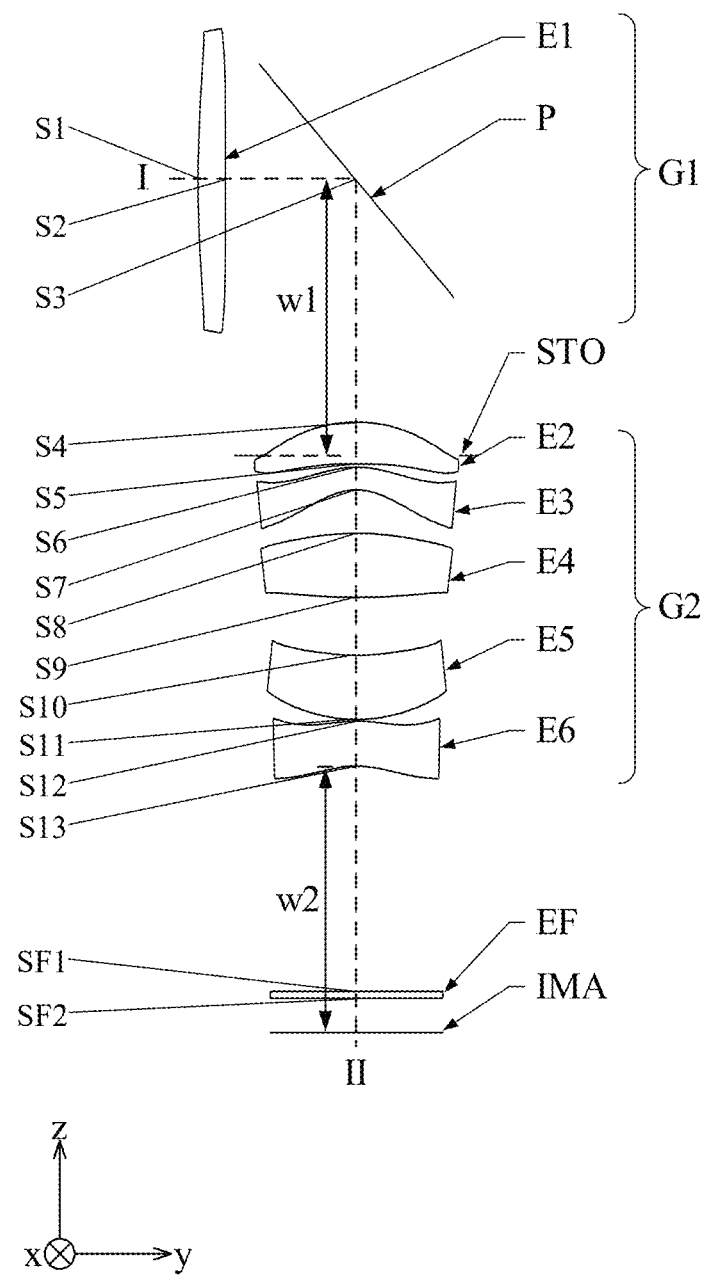
FIG. 12 shows a schematic structural diagram of an optical system according to Embodiment 2 of the disclosure.

The optical system according to Embodiment 2 is described below with reference to FIGS. 12, 13, 14 and 15. In this embodiment and the following embodiments, for brevity, a part of the descriptions similar to those in Embodiment 1 is omitted. FIG. 12 shows a schematic structural diagram of an optical system according to Embodiment 2 of the disclosure.

As shown in FIG. 12, the optical system 100 includes a first element group G1 and a second element group G2 reflective surface S3 is a planar surface. The second lens E2 has a positive refractive power, and an object-side surface S4 thereof is a convex surface and an image-side surface S5 thereof is a concave surface. The third lens E3 has a negative refractive power, and an object-side surface S6 thereof is a convex surface and an image-side surface S7 thereof is a concave surface. The fourth lens E4 has a positive refractive power, and an object-side surface S8 thereof is a convex surface and an image-side surface S9 thereof is a convex surface. The fifth lens E5 has a positive refractive power, and an object-side surface S10 thereof is a concave surface and an image-side surface S11 thereof is a convex surface. The sixth lens E6 has a negative refractive power, and an object-side surface S12 thereof is a convex surface and an image-side surface S13 thereof is a concave surface. The filter EF has an object-side surface SF1 and an image-side surface SF2. Light from an object sequentially passes through the respective surfaces S1 to SF2 and is finally imaged on the image plane IMA.

Table 3 shows basic parameters of the optical system 100 according to Embodiment 2, in which the units of radius of curvature, and thickness/distance are all millimeters (mm).

TABLE 3

| Surface number | Element | Surface shape | Radius of curvature | Thickness/ distance | Material | Refractive index | Abbe number | Focal length |
|---|---|---|---|---|---|---|---|---|
| S1 | First lens | Aspheric surface | 45.6299 | 1.3900 | Plastic | 1.516 | 56.999 | 85.83 |
| S2 | | Aspheric surface | −1683.0000 | 6.6559 | | | | |
| S3 | Reflective element | Spherical surface | Infinity | w1 | | | | |
| STO | Diaphragm | Spherical surface | Infinity | 1.4102 | | | | |
| S4 | Second lens | Aspheric surface | −8.9869 | −1.7620 | Plastic | 1.544 | 55.977 | 19.49 |
| S5 | | Aspheric surface | −53.9562 | −0.1429 | | | | |
| S6 | Third lens | Aspheric surface | −5.8031 | −0.9625 | Plastic | 1.630 | 24.610 | −14.11 |
| S7 | | Aspheric surface | −3.2950 | −1.8355 | | | | |
| S8 | Fourth lens | Aspheric surface | −17.2012 | −2.7100 | Plastic | 1.526 | 56.611 | 22.22 |
| S9 | | Aspheric surface | 34.8657 | −2.4533 | | | | |
| S10 | Fifth lens | Aspheric surface | 11.7398 | −2.7100 | Plastic | 1.671 | 19.400 | 53.12 |
| S11 | | Aspheric surface | 9.6778 | −0.0726 | | | | |
| S12 | Sixth lens | Aspheric surface | −8.2209 | −1.9006 | Plastic | 1.596 | 30.943 | −42.25 |
| S13 | | Aspheric surface | −5.6687 | w2 | | | | |
| SF1 | Filter | Spherical surface | Infinity | −0.2847 | Glass | 1.517 | 64.210 | |
| SF2 | | Spherical surface | Infinity | −1.4523 | | | | |
| IMA | Image plane | Spherical surface | Infinity | | | | | |

As shown in FIG. 12, during the anti-shaking process of the optical system 100, the position of the image plane IMA remains fixed, and the first element group G1 rotates around the z direction.

During the focusing process of the optical system 100, in the embodiment, the position of the image plane IMA remains fixed, the position of the first element group G1 remains fixed, and the second element group G2 moves along the optical axis II, so that the distance between the first element group G1 and the second element group G2 (in the embodiment, between the reflective element P and the second lens E2) is adjustable. When the distance from the photographed object to the optical system 100 changes from far to near, the second element group G2 is able to move towards the reflective element P along the optical axis II, i.e. reducing the distance between the second element group G2 and the reflective element P on the optical axis II. When the distance from the photographed object to the optical system 100 changes from near to far, the second element group G2 is able to move towards the image side (in the embodiment, the image plane IMA) along the optical axis II, i.e. increasing the distance between the second element group G2 and the reflective element P on the optical axis II. In the optical system 100, the second element group G2 serves as a movable lens group for compensation.

During the movement of the second element group G2, the distance w1 between the reflective surface S3 of the reflective element P and the diaphragm STO on the optical axis II, and the distance w2 between the image-side surface S13 of the sixth lens E6 and the object-side surface SF1 of the filter EF on the optical axis II are variable. When the distance between the photographed object and the optical system 100 is infinity, the w1 is equal to −11.6144 mm, and the w2 is equal to −9.5320 mm. When the distance between the photographed object and the optical system 100 is 40 cm, the w1 is equal to −9.2960 mm, and the w2 is equal to −11.8504 mm.

In this embodiment, the object-side surface and the image-side surface of any one of the first lens E1 to the sixth lens E6 are aspheric surfaces. Table 4 provides conic coefficients K and high-order term coefficients $A_4$, $A_6$, $A_8$, $A_{10}$, $A_{12}$, $A_{14}$ and $A_{16}$ that is able to be applied to the respective aspheric surfaces S1-S2 and S4-S13 in Embodiment 2.

TABLE 4

| Surface number | K | $A_4$ | $A_6$ | $A_8$ | $A_{10}$ | $A_{12}$ | $A_{14}$ | $A_{16}$ |
|---|---|---|---|---|---|---|---|---|
| S1 | −25.720 | −7.00E−02 | −2.60E−02 | 1.00E−03 | −1.00E−03 | 0.00E+00 | 0.00E+00 | 0.00E+00 |
| S2 | −90.000 | −1.25E−01 | −2.60E−02 | 2.00E−03 | −1.00E−03 | 0.00E+00 | 0.00E+00 | 0.00E+00 |
| S4 | −10.307 | −7.70E−02 | 1.57E−01 | 4.00E−03 | 1.30E−02 | 1.00E−03 | 1.00E−03 | −1.00E−03 |
| S5 | 88.415 | −2.03E−01 | 2.13E−01 | −9.00E−03 | 1.50E−02 | −4.00E−03 | 2.00E−03 | −1.00E−03 |
| S6 | −1.905 | 1.40E+00 | −1.12E−01 | 1.30E−02 | −5.00E−03 | −1.00E−03 | 0.00E+00 | 0.00E+00 |
| S7 | −3.056 | 4.91E−01 | 1.60E−02 | −1.60E−02 | −5.00E−03 | −1.00E−03 | −1.00E−03 | 1.00E−03 |
| S8 | −14.428 | −7.20E−02 | −1.00E−03 | −2.10E−02 | −6.00E−03 | −4.00E−03 | −1.00E−03 | 1.00E−03 |
| S9 | 41.323 | −1.74E−01 | −2.40E−02 | −2.00E−03 | −1.00E−03 | −3.00E−03 | −1.00E−03 | 0.00E+00 |
| S10 | 3.271 | −3.90E−01 | 8.80E−02 | 0.00E+00 | 4.00E−03 | −1.00E−03 | 0.00E+00 | 0.00E+00 |
| S11 | 2.308 | −1.81E−01 | −1.80E−02 | 6.00E−03 | −3.00E−03 | −1.00E−03 | 0.00E+00 | −1.00E−03 |
| S12 | −0.003 | 1.41E+00 | −1.40E−01 | 1.70E−02 | 0.00E+00 | −1.00E−03 | 0.00E+00 | −1.00E−03 |
| S13 | −3.409 | 7.62E−01 | −9.40E−02 | 1.30E−02 | −1.00E−03 | 0.00E+00 | 0.00E+00 | 0.00E+00 |

Figure 13:
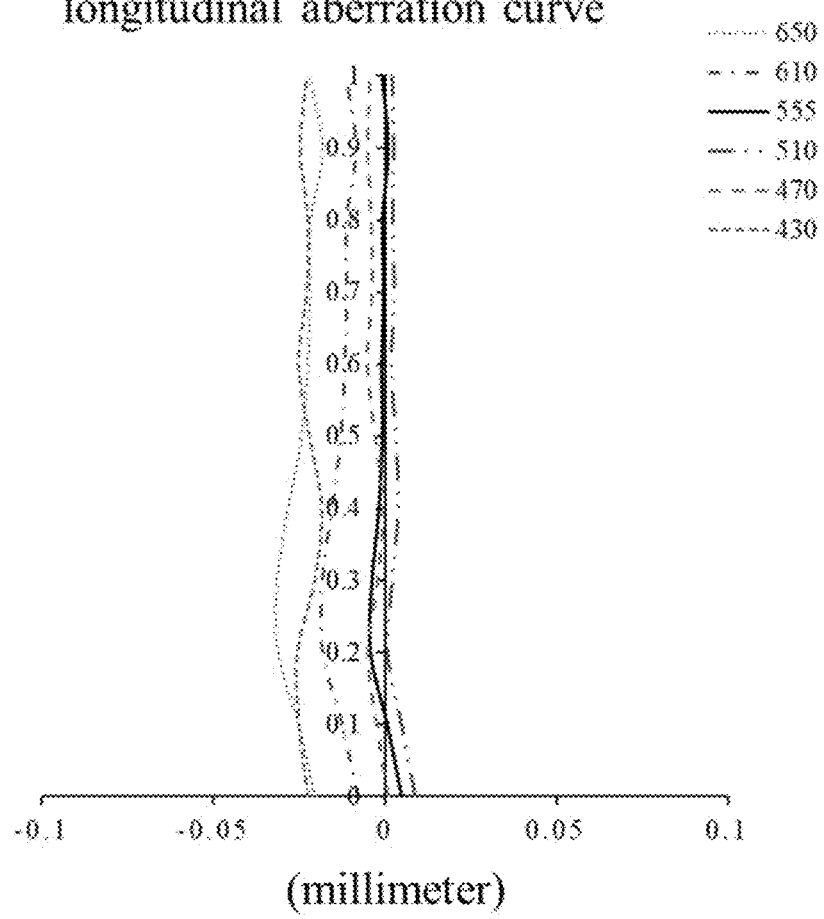
FIG. 13, FIG. 14 and FIG. 15 respectively show a longitudinal aberration curve, an astigmatism curve and a distortion curve of an optical system according to Embodiment 2 of the disclosure.
Figure 14:
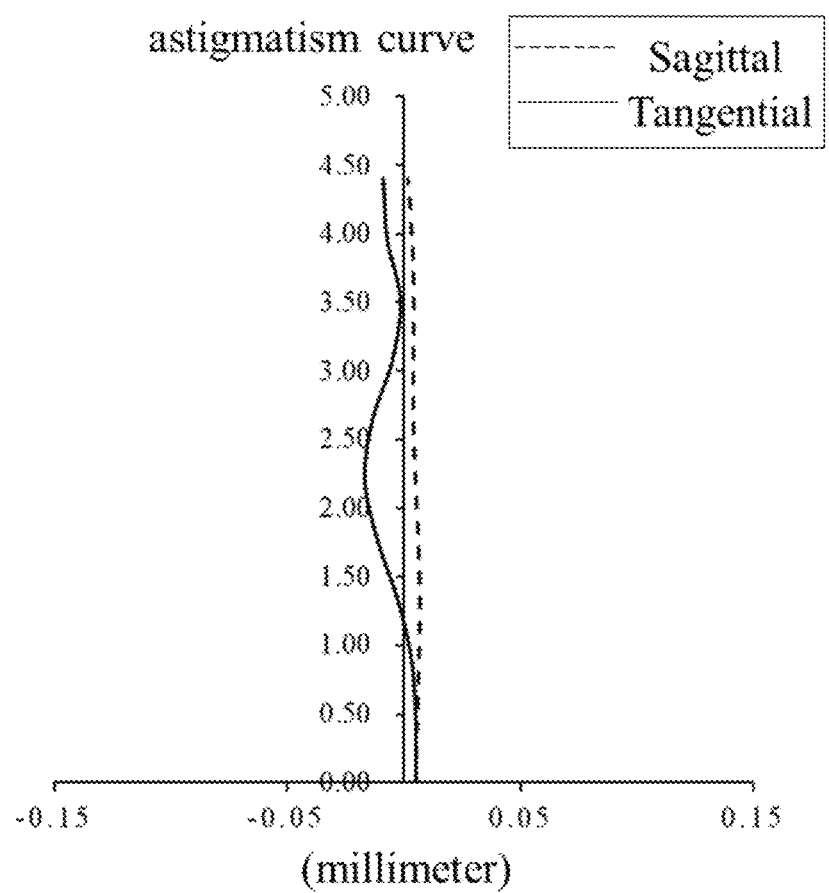
Figure 15:
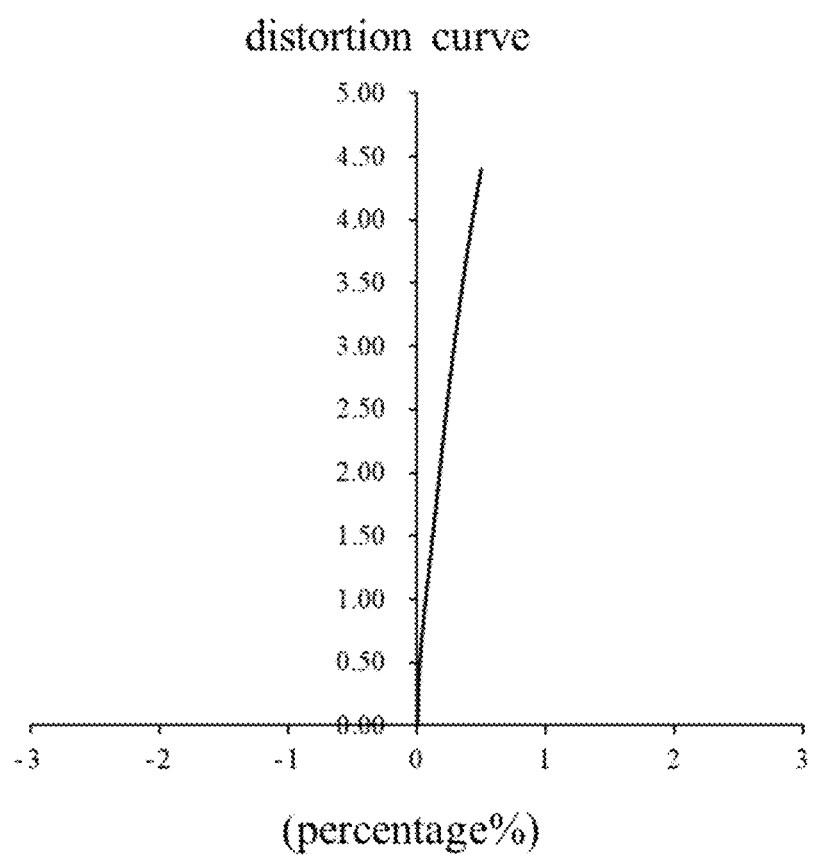

FIG. 13 shows a longitudinal aberration curve of the optical system 100 according to Embodiment 2, which represents the deviation of a convergent focal point of light rays of different wavelengths after passing through the optical system 100. FIG. 14 shows an astigmatism curve of the optical system 100 according to Embodiment 2, which represents the tangential image plane curvature and the sagittal image plane curvature corresponding to different image heights. FIG. 15 shows a distortion curve of the optical system 100 according to Embodiment 2, which represents the distortion magnitude values corresponding to different image heights. It is able to be determined from FIGS. 13, 14 and 15 that the optical system 100 according to Embodiment 2 is able to achieve good imaging quality.

Embodiment 3

Figure 16:
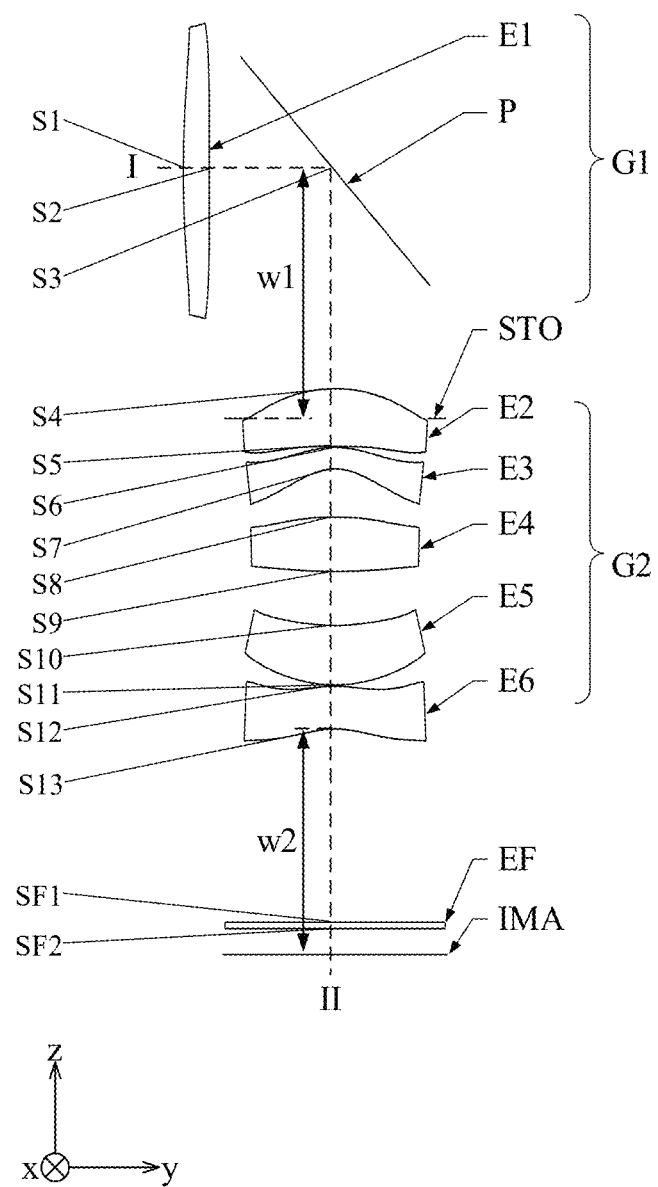
FIG. 16 shows a schematic structural diagram of an optical system according to Embodiment 3 of the disclosure.

The optical system according to Embodiment 3 is described below with reference to FIGS. 16, 17, 18 and 19. FIG. 16 shows a schematic structural diagram of an optical system according to Embodiment 3 of the disclosure.

As shown in FIG. 16, the optical system 100 includes a first element group G1 and a second element group G2 sequentially arranged from an object side to an image side. The image side is provided with an image plane IMA. In the embodiment, the imageable object distance of the optical system 100 ranges from 38 cm to infinity.

The first element group G1 includes a first lens E1, and a reflective element P. The second element group G2 includes a second lens E2, a third lens E3, a fourth lens E4, a fifth lens E5, and a sixth lens E6. In the embodiment, the first lens E1 is located on an optical axis I and provided between the object side and a reflective element P. The second lens E2, the third lens E3, the fourth lens E4, the fifth lens E5, and the sixth lens E6 are sequentially arranged from the reflective element P to the image side along an optical axis II. The image plane IMA is located on the optical axis II. A filter EF is provided between the sixth lens E6 and the image plane IMA. A diaphragm STO is provided between the reflective element P and the second lens E2.

The first lens E1 has a positive refractive power, and an object-side surface S1 thereof is a convex surface and an image-side surface S2 thereof is a convex surface. The reflective element P has a reflective surface S3, and the reflective surface S3 is a planar surface. The second lens E2 has a positive refractive power, and an object-side surface S4 thereof is a convex surface and an image-side surface S5 thereof is a concave surface. The third lens E3 has a negative refractive power, and an object-side surface S6 thereof is a convex surface and an image-side surface S7 thereof is a concave surface. The fourth lens E4 has a positive refractive power, and an object-side surface S8 thereof is a convex surface and an image-side surface S9 thereof is a convex surface. The fifth lens E5 has a positive refractive power, and an object-side surface S10 thereof is a concave surface and an image-side surface S11 thereof is a convex surface. The sixth lens E6 has a negative refractive power, and an object-side surface S12 thereof is a convex surface and an image-side surface S13 thereof is a concave surface. The filter EF has an object-side surface SF1 and an image-side surface SF2. Light from an object sequentially passes through the respective surfaces S1 to SF2 and is finally imaged on the image plane IMA.

Table 5 shows basic parameters of the optical system 100 according to Embodiment 3, in which the units of radius of curvature, and thickness/distance are all millimeters (mm).

TABLE 5

| Surface number | Element | Surface shape | Radius of curvature | Thickness/distance | Material | Refractive index | Abbe number | Focal length |
|---|---|---|---|---|---|---|---|---|
| S1 | First lens | Aspheric surface | 40.9994 | 1.354 | Plastic | 1.517 | 56.951 | 77.14 |
| S2 | | Aspheric surface | −1683.0000 | 6.5695 | | | | |
| S3 | Reflective element | Spherical surface | Infinity | w1 | | | | |
| STO | Diaphragm | Spherical surface | Infinity | 1.2848 | | | | |
| S4 | Second lens | Aspheric surface | −8.6710 | −2.4862 | Plastic | 1.520 | 56.836 | 18.96 |
| S5 | | Aspheric surface | −63.2311 | −0.0400 | | | | |
| S6 | Third lens | Aspheric surface | −5.4065 | −0.9340 | Plastic | 1.636 | 23.853 | −13.14 |
| S7 | | Aspheric surface | −3.0695 | −2.0786 | | | | |
| S8 | Fourth lens | Aspheric surface | −16.1412 | −2.3513 | Plastic | 1.528 | 56.547 | 20.48 |
| S9 | | Aspheric surface | 31.3954 | −2.3293 | | | | |
| S10 | Fifth lens | Aspheric surface | 11.0263 | −2.5600 | Plastic | 1.671 | 19.400 | 50.92 |
| S11 | | Aspheric surface | 9.1394 | −0.0600 | | | | |
| S12 | Sixth lens | Aspheric surface | −8.2428 | −1.8406 | Plastic | 1.571 | 32.628 | −42.49 |
| S13 | | Aspheric surface | −5.6593 | w2 | | | | |
| SF1 | Filter | Spherical surface | Infinity | −0.2688 | Glass | 1.517 | 64.210 | |
| SF2 | | Spherical surface | Infinity | −1.1131 | | | | |
| IMA | Image plane | Spherical surface | Infinity | | | | | |

As shown in FIG. 16, during the anti-shaking process of the optical system 100, the position of the image plane IMA remains fixed, and the first element group G1 rotates around the z direction.

During the focusing process of the optical system 100, in the embodiment, the position of the image plane IMA remains fixed, the position of the first element group G1 remains fixed, and the second element group G2 moves along the optical axis II, so that the distance between the first element group G1 and the second element group G2 (in the embodiment, between the reflective element P and the second lens E2) is adjustable. When the distance from the photographed object to the optical system 100 changes from far to near, the second element group G2 is able to move towards the reflective element P along the optical axis II, i.e. reducing the distance between the second element group G2 and the reflective element P on the optical axis II. When the distance from the photographed object to the optical system 100 changes from near to far, the second element group G2 is able to move towards the image side (in the embodiment, the image plane IMA) along the optical axis II, i.e. increasing the distance between the second element group G2 and the reflective element P on the optical axis II. In the optical system 100, the second element group G2 serves as a movable lens group for compensation.

During the movement of the second element group G2, the distance w1 between the reflective surface S3 of the reflective element P and the diaphragm STO on the optical axis II, and the distance w2 between the image-side surface S13 of the sixth lens E6 and the object-side surface SF1 of the filter EF on the optical axis II are variable. When the distance between the photographed object and the optical system 100 is infinity, the w1 is equal to −10.6761 mm, and the w2 is equal to −8.3529 mm. When the distance between the photographed object and the optical system 100 is 38 cm, the w1 is equal to −8.4786 mm, and the w2 is equal to −10.5504 mm.

In this embodiment, the object-side surface and the image-side surface of any one of the first lens E1 to the sixth lens E6 are aspheric surfaces. Table 6 provides conic coefficients K and high-order term coefficients $A_4$, $A_6$, $A_8$, $A_{10}$, $A_{12}$, $A_{14}$ and $A_{16}$ that is able to be applied to the respective aspheric surfaces S1-S2 and S4-S13 in Embodiment 3.

TABLE 6

| Surface number | K | $A_4$ | $A_6$ | $A_8$ | $A_{10}$ | $A_{12}$ | $A_{14}$ | $A_{16}$ |
|---|---|---|---|---|---|---|---|---|
| S1  | −23.271 | −7.80E−02 | −2.50E−02 | −1.00E−03 | −1.00E−03 | 0.00E+00 | 0.00E+00 | 0.00E+00 |
| S2  | 90.000  | −1.38E−01 | −2.40E−02 | 0.00E+00  | −1.00E−03 | 0.00E+00 | 0.00E+00 | 0.00E+00 |
| S4  | −12.493 | −6.55E−01 | 1.17E−01  | −1.00E−03 | 5.00E−03  | 0.00E+00 | 0.00E+00 | 0.00E+00 |
| S5  | 89.496  | −1.73E−01 | 1.60E−01  | −1.20E−02 | 1.00E−03  | −2.00E−03 | 0.00E+00 | −1.00E−03 |
| S6  | −1.841  | 1.19E+00  | −1.03E−01 | 1.00E−02  | −5.00E−03 | 0.00E+00 | −1.00E−03 | −1.00E−03 |
| S7  | −3.030  | 4.01E−01  | 1.20E−02  | −8.00E−03 | −2.00E−03 | 0.00E+00 | 0.00E+00 | 0.00E+00 |
| S8  | −19.120 | −1.60E−02 | 4.50E−02  | −5.00E−03 | −6.00E−03 | −1.00E−03 | 0.00E+00 | 0.00E+00 |
| S9  | 43.057  | −1.85E−01 | −1.60E−02 | −4.00E−03 | −3.00E−03 | 0.00E+00 | 0.00E+00 | 0.00E+00 |
| S10 | 3.180   | −3.86E−01 | 8.90E−02  | 1.00E−03  | 6.00E−03  | 0.00E+00 | 1.00E−03 | 0.00E+00 |
| S11 | 2.227   | −3.03E−01 | −4.90E−02 | −2.00E−03 | −1.00E−02 | −1.00E−03 | −1.00E−03 | 0.00E+00 |
| S12 | −0.001  | 1.92E+00  | −2.82E−01 | 2.70E−02  | −1.00E−03 | 1.00E−03 | 0.00E+00 | 0.00E+00 |
| S13 | −3.234  | 1.19E+00  | −2.00E−01 | 2.80E−02  | −7.00E−03 | 1.00E−03 | 0.00E+00 | 0.00E+00 |

Figure 17:
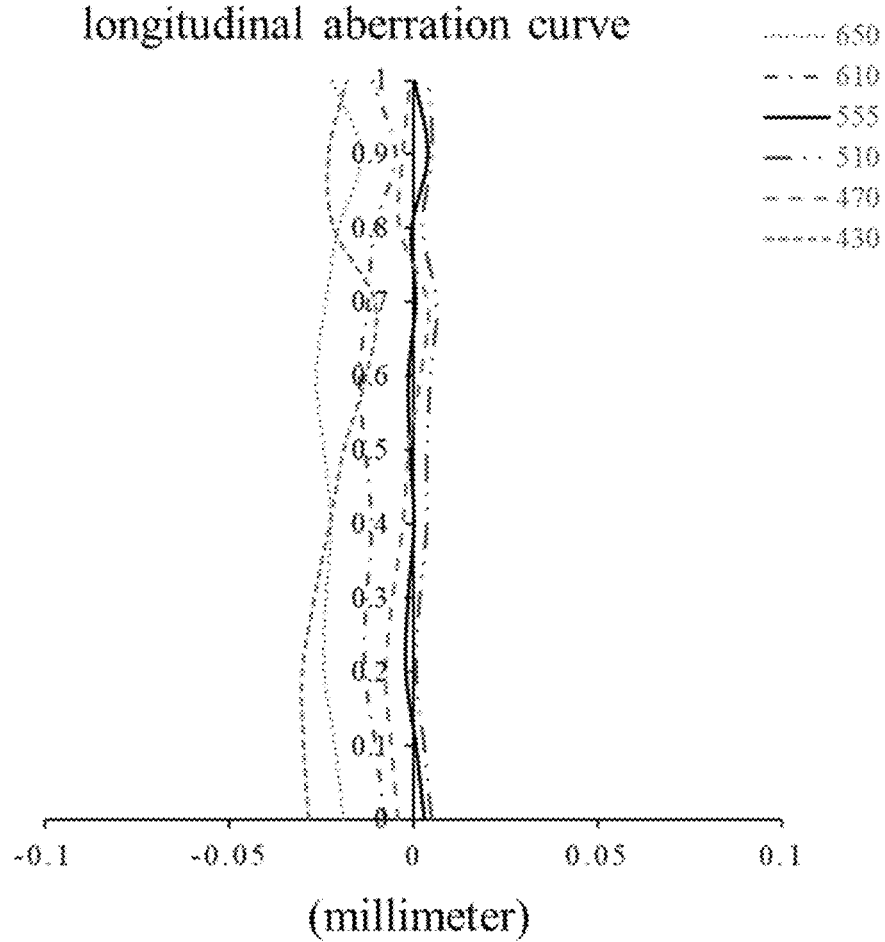
FIG. 17, FIG. 18 and FIG. 19 respectively show a longitudinal aberration curve, an astigmatism curve and a distortion curve of an optical system according to Embodiment 3 of the disclosure.
Figure 18:
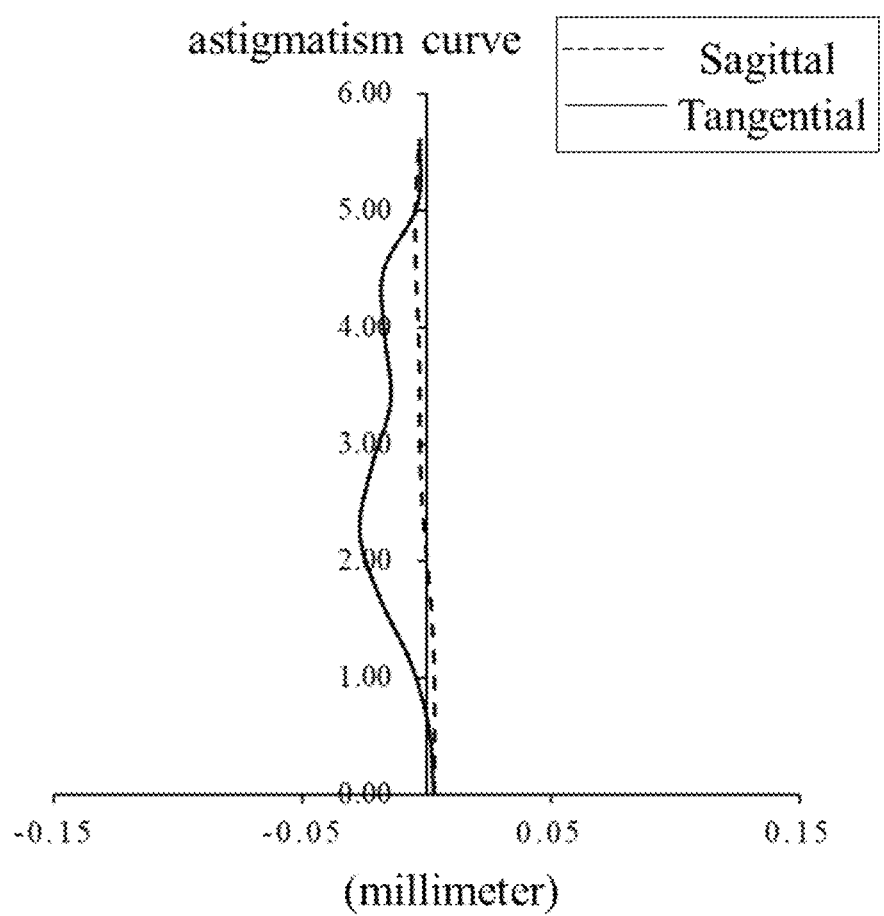
Figure 19:
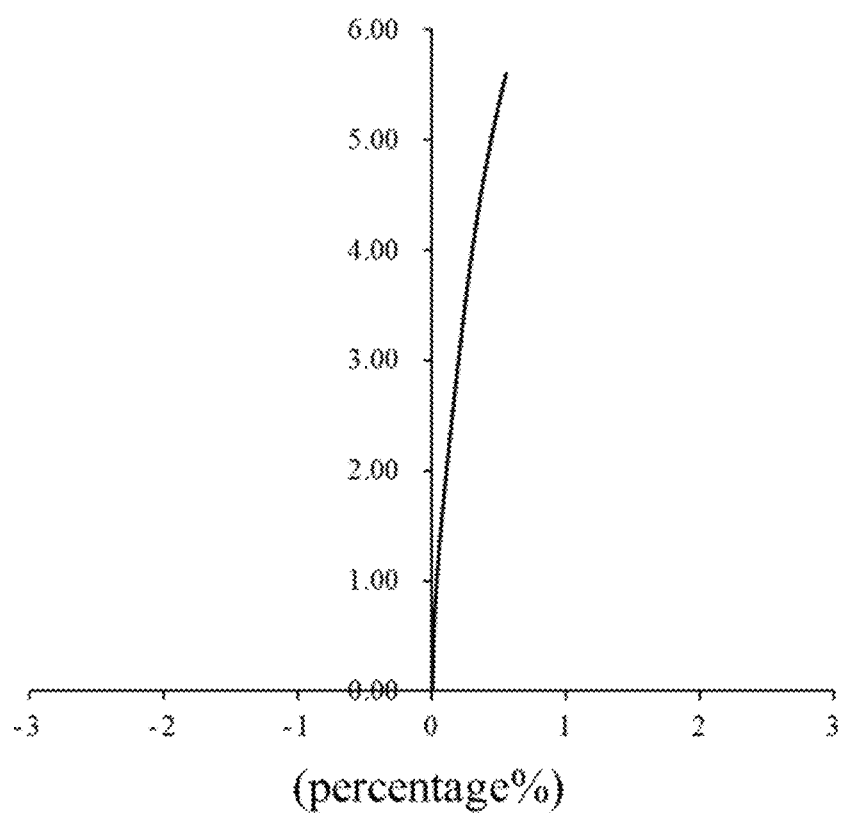

FIG. 17 shows a longitudinal aberration curve of the optical system 100 according to Embodiment 3, which represents the deviation of a convergent focal point of light rays of different wavelengths after passing through the optical system 100. FIG. 18 shows an astigmatism curve of the optical system 100 according to Embodiment 3, which represents the tangential image plane curvature and the sagittal image plane curvature corresponding to different image heights. FIG. 19 shows a distortion curve of the optical system 100 according to Embodiment 3, which represents the distortion magnitude values corresponding to different image heights. It is able to be determined from FIGS. 17, 18 and 19 that the optical system 100 according to Embodiment 3 is able to achieve good imaging quality.

Embodiment 4

Figure 20:
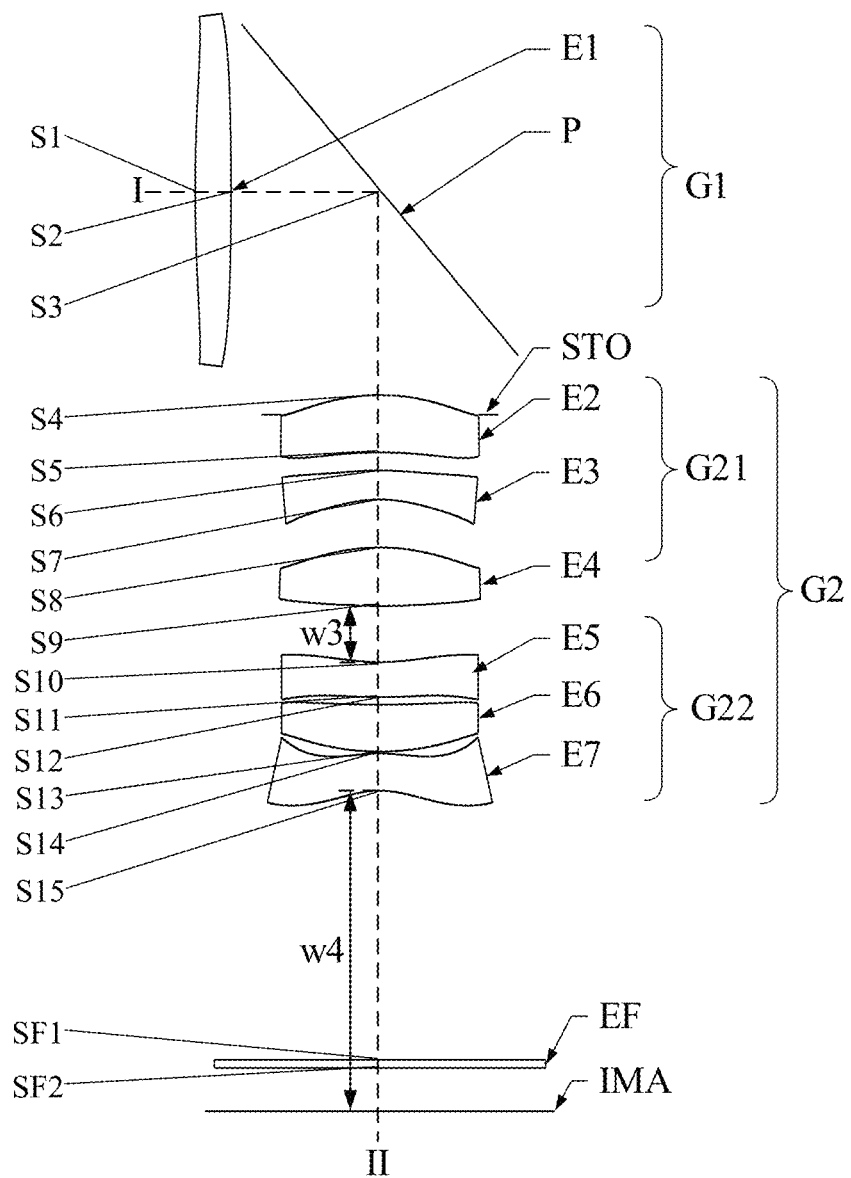
FIG. 20 shows a schematic structural diagram of an optical system according to Embodiment 4 of the disclosure.

The optical system according to Embodiment 4 is described below with reference to FIGS. 20, 21, 22 and 23. FIG. 20 shows a schematic structural diagram of an optical system according to Embodiment 4 of the disclosure.

As shown in FIG. 20, the optical system 100 includes a first element group G1 and a second element group G2 sequentially arranged from an object side to an image side. The image side is provided with an image plane IMA. In the embodiment, the imageable object distance of the optical system 100 ranges from 30 cm to infinity.

The first element group G1 includes a first lens E1, and a reflective element P. The second element group G2 includes a second lens E2, a third lens E3, a fourth lens E4, a fifth lens E5, a sixth lens E6, and a seventh lens E7. In the embodiment, the first lens E1 is located on an optical axis I and provided between the object side and a reflective element P. The second lens E2, the third lens E3, the fourth lens E4, the fifth lens E5, the sixth lens E6 and the seventh lens E7 are sequentially arranged from the reflective element P to the image side along an optical axis II. The second lens E2, the third lens E3, and the fourth lens E4 constitute the first lens group G21. The fifth lens E5, the sixth lens E6, and the seventh lens E7 constitute the second lens group G22. The image plane IMA is located on the optical axis II. A filter EF is provided between the seventh lens E7 and the image plane IMA. A diaphragm STO is provided between the reflective element P and the second lens E2.

The first lens E1 has a positive refractive power, and an object-side surface S1 thereof is a convex surface and an image-side surface S2 thereof is a convex surface. The reflective element P has a reflective surface S3, and the reflective surface S3 is a planar surface. The second lens E2 has a positive refractive power, and an object-side surface S4 thereof is a convex surface and an image-side surface S5 thereof is a concave surface. The third lens E3 has a negative refractive power, and an object-side surface S6 thereof is a convex surface and an image-side surface S7 thereof is a concave surface. The fourth lens E4 has a positive refractive power, and an object-side surface S8 thereof is a convex surface and an image-side surface S9 thereof is a convex surface. The fifth lens E5 has a negative refractive power, and an object-side surface S10 thereof is a concave surface and an image-side surface S11 thereof is a convex surface. The sixth lens E6 has a positive refractive power, and an object-side surface S12 thereof is a concave surface and an image-side surface S13 thereof is a convex surface. The seventh lens E7 has a negative refractive power, and an object-side surface S14 thereof is a convex surface and an image-side surface S15 thereof is a concave surface. The filter EF has an object-side surface SF1 and an image-side surface SF2. Light from an object sequentially passes through the respective surfaces S1 to SF2 and is finally imaged on the image plane IMA.

Table 7 shows basic parameters of the optical system 100 according to Embodiment 4, in which the units of radius of curvature, and thickness/distance are all millimeters (mm).

TABLE 7

| Surface number | Element | Surface shape | Radius of curvature | Thickness/ distance | Material | Refractive index | Abbe number | Focal length |
|---|---|---|---|---|---|---|---|---|
| S1 | First lens | Aspheric surface | 33.8748  | 1.1000 | Plastic | 1.501 | 55.986 | 43.71 |
| S2 |            | Aspheric surface | −80.0000 | 4.5800 |         |       |        |       |

TABLE 7-continued

| Surface number | Element | Surface shape | Radius of curvature | Thickness/ distance | Material | Refractive index | Abbe number | Focal length |
|---|---|---|---|---|---|---|---|---|
| S3 | Reflective element | Spherical surface | Infinity | −6.0697 | | | | |
| STO | Diaphragm | Spherical surface | Infinity | 0.4933 | | | | |
| S4 | Second lens | Aspheric surface | −7.7537 | −1.1436 | Plastic | 1.260 | 55.710 | 22.09 |
| S5 | | Aspheric surface | −21.2440 | −0.7519 | | | | |
| S6 | Third lens | Aspheric surface | −13.9390 | −0.7408 | Plastic | 1.800 | 20.370 | −12.48 |
| S7 | | Aspheric surface | −5.0978 | −1.1700 | | | | |
| S8 | Fourth lens | Aspheric surface | −8.0608 | −1.5000 | Plastic | 1.551 | 55.929 | 10.69 |
| S9 | | Aspheric surface | 19.8600 | w3 | | | | |
| S10 | Fifth lens | Aspheric surface | 7.6893 | −0.9607 | Plastic | 1.551 | 55.929 | −24.10 |
| S11 | | Aspheric surface | 19.2839 | −0.3908 | | | | |
| S12 | Sixth lens | Aspheric surface | 31.1553 | −1.2000 | Plastic | 1.900 | 19.246 | 19.84 |
| S13 | | Aspheric surface | 9.5376 | −0.0500 | | | | |
| S14 | Seventh lens | Aspheric surface | −5.1343 | −0.8621 | Plastic | 1.551 | 55.929 | −15.27 |
| S15 | | Aspheric surface | −2.9906 | w4 | | | | |
| SF1 | Filter | Spherical surface | Infinity | −0.2100 | Glass | 1.517 | 64.210 | |
| SF2 | | Spherical surface | Infinity | −1.1120 | | | | |
| IMA | Image plane | Spherical surface | Infinity | | | | | |

As shown in FIG. 20, during the anti-shaking process of the optical system 100, the position of the image plane IMA remains fixed, and the first element group G1 rotates around the z direction.

During the focusing process of the optical system 100, in the embodiment, the position of the image plane IMA remains fixed, the positions of the first element group G1 and the first lens group G21 remain fixed, and the second lens group G22 moves along the optical axis II, so that the distance between the first lens group G21 and the second lens group G22 (in the embodiment, the fourth lens E4 and the second lens E2) is adjustable. When the distance from the photographed object to the optical system 100 changes from far to near, the second lens group G22 is able to move towards the image side (in the embodiment, the image plane IMA) along the optical axis II, i.e. increasing the distance between the second lens group G22 and the first lens group G21 on the optical axis II. When the distance from the photographed object to the optical system 100 changes from near to far, the second lens group G22 is able to move towards the first lens group G21 along the optical axis II, i.e. reducing the distance between the second lens group G22 and the first lens group G21 on the optical axis II. In the optical system 100, the second lens group G22 serves as a movable lens group for compensation.

During the movement of the second lens group G22, the distance w3 between the image-side surface of the fourth lens E4 and the object-side surface of the fifth lens E5 on the optical axis II, and the distance w4 between the image-side surface S15 of the seventh lens E7 and the object-side surface SF1 of the filter EF on the optical axis II are variable. When the distance between the photographed object and the optical system 100 is infinity, the w3 is equal to −1.4627 mm, and the w4 is equal to −6.4689 mm. When the distance between the photographed object and the optical system 100 is 30 cm, the w3 is equal to −3.0306 mm, and the w4 is equal to −4.9010 mm.

In this embodiment, the object-side surface and the image-side surface of any one of the first lens E1 to the seventh lens E7 are aspheric surfaces. Table 8 provides conic coefficients K and high-order term coefficients $A_4$, $A_6$, $A_8$, $A_{10}$, $A_{12}$, $A_{14}$, $A_{16}$ and $A_{18}$ that is able to be applied to the respective aspheric surfaces S1-S2 and S4-S15 in Embodiment 4.

TABLE 8

| Surface number | K | $A_4$ | $A_6$ | $A_8$ | $A_{10}$ | $A_{12}$ | $A_{14}$ | $A_{16}$ | A18 |
|---|---|---|---|---|---|---|---|---|---|
| S1 | 34.084 | −1.72E−01 | −2.70E−02 | −3.00E−03 | 0.00E+00 | 0.00E+00 | 0.00E+00 | 0.00E+00 | 0.00E+00 |
| S2 | −85.302 | −1.33E−01 | −2.70E−02 | −2.00E−03 | 0.00E+00 | 0.00E+00 | 0.00E+00 | 0.00E+00 | 0.00E+00 |
| S4 | −19.903 | −2.00E−01 | 7.30E−02 | 0.00E+00 | 2.00E−03 | −1.00E−03 | 0.00E+00 | 0.00E+00 | 0.00E+00 |
| S5 | −90.000 | −2.00E−03 | 6.20E−02 | −5.00E−03 | 2.00E−03 | −2.00E−03 | 0.00E+00 | 0.00E+00 | 0.00E+00 |
| S6 | 6.203 | 1.94E−01 | −1.80E−02 | −5.00E−03 | 4.00E−03 | −2.00E−03 | 1.00E−03 | 0.00E+00 | 0.00E+00 |
| S7 | −1.512 | 1.87E−01 | −3.20E−02 | −2.00E−03 | 4.00E−03 | −2.00E−03 | 1.00E−03 | 0.00E+00 | 0.00E+00 |
| S8 | −8.704 | −6.00E−02 | 7.10E−02 | 1.10E−02 | 4.00E−03 | −4.00E−03 | −3.00E−03 | −3.00E−03 | −1.00E−03 |
| S9 | −7.899 | −2.80E−02 | 5.50E−02 | 9.00E−03 | 1.00E−03 | −2.00E−03 | −1.00E−03 | −1.00E−03 | −1.00E−03 |
| S10 | 1.628 | −5.05E−01 | 2.80E−02 | −4.00E−03 | 0.00E+00 | 1.00E−03 | 0.00E+00 | 0.00E+00 | 0.00E+00 |
| S11 | −90.000 | −3.01E−01 | 2.00E−02 | 2.00E−03 | 0.00E+00 | 5.00E−03 | 2.00E−03 | 1.00E−03 | 1.00E−03 |
| S12 | 90.000 | −2.00E−01 | −2.90E−02 | −1.60E−02 | −3.00E−03 | 3.00E−03 | 2.00E−03 | 2.00E−03 | 2.00E−03 |
| S13 | −28.441 | 2.60E−01 | −4.10E−02 | 4.00E−03 | −5.00E−03 | 1.00E−03 | 0.00E+00 | 1.00E−03 | 1.00E−03 |
| S14 | −12.512 | 1.17E+00 | −9.90E−02 | 2.30E−02 | −1.00E−03 | 5.00E−03 | 4.00E−03 | 3.00E−03 | 2.00E−03 |
| S15 | −0.942 | 2.02E+00 | −2.62E−01 | 5.40E−02 | −1.10E−02 | 5.00E−03 | 0.00E+00 | 0.00E+00 | 0.00E+00 |

Figure 21:
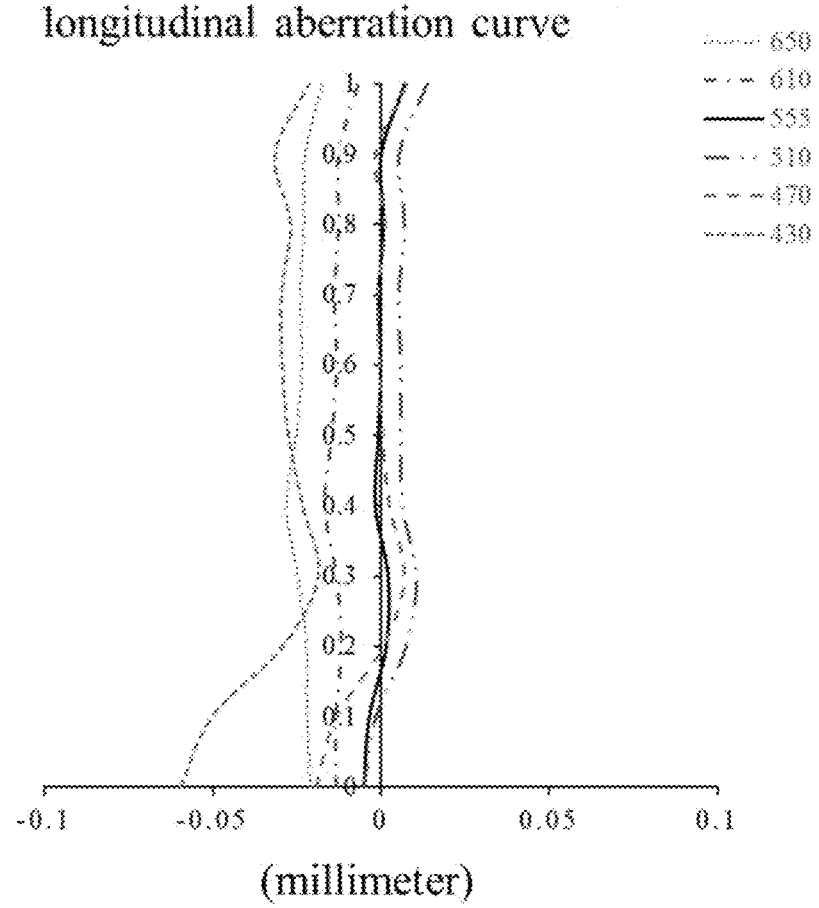
FIG. 21, FIG. 22 and FIG. 23 respectively show a longitudinal aberration curve, an astigmatism curve and a distortion curve of an optical system according to Embodiment 4 of the disclosure.
Figure 22:
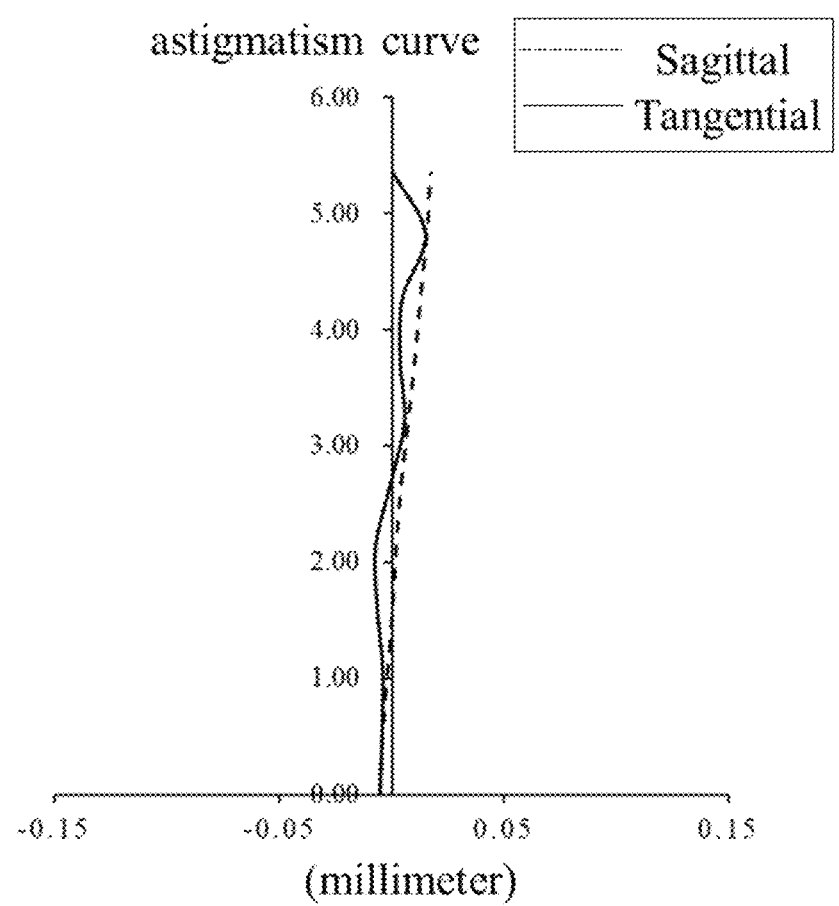
Figure 23:
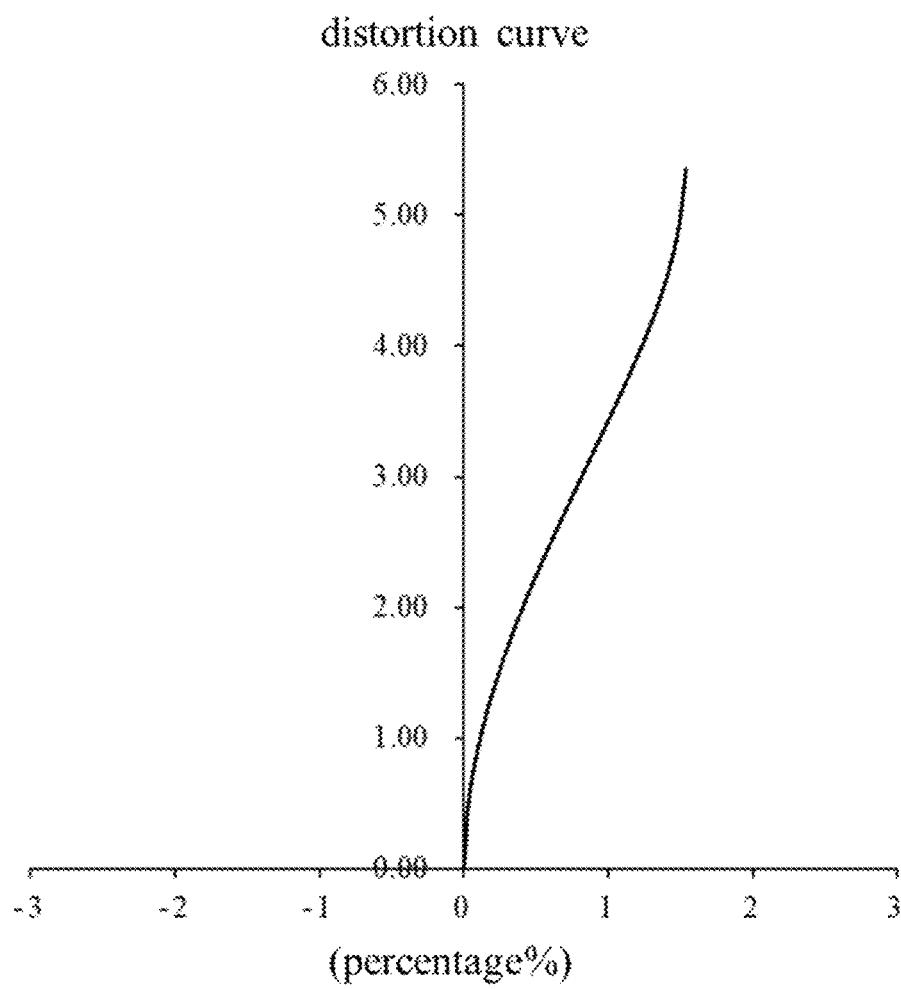

FIG. 21 shows a longitudinal aberration curve of the optical system 100 according to Embodiment 4, which represents the deviation of a convergent focal point of light rays of different wavelengths after passing through the optical system 100. FIG. 22 shows an astigmatism curve of the optical system 100 according to Embodiment 4, which represents the tangential image plane curvature and the sagittal image plane curvature corresponding to different image heights. FIG. 23 shows a distortion curve of the optical system 100 according to Embodiment 4, which represents the distortion magnitude values corresponding to different image heights. It is able to be determined from FIGS. 21, 22 and 23 that the optical system 100 according to Embodiment 4 is able to achieve good imaging quality.

Embodiment 5

The optical system according to Embodiment 5 is described below with reference to FIGS. 24, 25, 26 and 27. FIG. 24 shows a schematic structural diagram of an optical system according to Embodiment 5 of the disclosure.

As shown in FIG. 24, the optical system 100 includes a first element group G1 and a second element group G2 sequentially arranged from an object side to an image side. The image side is provided with an image plane IMA. In the embodiment, the imageable object distance of the optical system 100 ranges from 30 cm to infinity.

The first element group G1 includes a first lens E1, and a reflective element P. The second element group G2 includes a second lens E2, a third lens E3, a fourth lens E4, a fifth lens E5, a sixth lens E6, and a seventh lens E7. In the embodiment, the first lens E1 is located on an optical axis I and provided between the object side and a reflective element P. The second lens E2, the third lens E3, the fourth lens E4, the fifth lens E5, the sixth lens E6 and the seventh lens E7 are sequentially arranged from the reflective element P to the image side along an optical axis II. The second lens E2, the third lens E3, and the fourth lens E4 constitute the first lens group G21. The fifth lens E5, the sixth lens E6, and the seventh lens E7 constitute the second lens group G22. The image plane IMA is located on the optical axis II. A filter EF is provided between the seventh lens E7 and the image plane IMA. A diaphragm STO is provided between the reflective element P and the second lens E2.

The first lens E1 has a positive refractive power, and an object-side surface S1 thereof is a convex surface and an image-side surface S2 thereof is a convex surface. The reflective element P has a reflective surface S3, and the reflective surface S3 is a planar surface. The second lens E2 has a positive refractive power, and an object-side surface S4 thereof is a convex surface and an image-side surface S5 thereof is a concave surface. The third lens E3 has a negative refractive power, and an object-side surface S6 thereof is a convex surface and an image-side surface S7 thereof is a concave surface. The fourth lens E4 has a positive refractive power, and an object-side surface S8 thereof is a convex surface and an image-side surface S9 thereof is a convex surface. The fifth lens E5 has a negative refractive power, and an object-side surface S10 thereof is a concave surface and an image-side surface S11 thereof is a convex surface. The sixth lens E6 has a positive refractive power, and an object-side surface S12 thereof is a concave surface and an image-side surface S13 thereof is a convex surface. The seventh lens E7 has a negative refractive power, and an object-side surface S14 thereof is a convex surface and an image-side surface S15 thereof is a concave surface. The filter EF has an object-side surface SF1 and an image-side surface SF2. Light from an object sequentially passes through the respective surfaces S1 to SF2 and is finally imaged on the image plane IMA.

Table 9 shows basic parameters of the optical system 100 according to Embodiment 5, in which the units of radius of curvature, and thickness/distance are all millimeters (mm).

TABLE 9

| Surface number | Element | Surface shape | Radius of curvature | Thickness/ distance | Material | Refractive index | Abbe number | Focal length |
|---|---|---|---|---|---|---|---|---|
| S1 | First lens | Aspheric surface | 35.1909 | 1.1000 | Plastic | 1.501 | 55.986 | 44.89 |
| S2 | | Aspheric surface | −80.0000 | 4.5592 | | | | |
| S3 | Reflective element | Spherical surface | Infinity | −5.7512 | | | | |
| STO | Diaphragm | Spherical surface | Infinity | 0.5003 | | | | |
| S4 | Second lens | Aspheric surface | −7.6619 | −1.4690 | Plastic | 1.260 | 55.710 | 22.09 |
| S5 | | Aspheric surface | −19.8910 | −0.4638 | | | | |
| S6 | Third lens | Aspheric surface | −13.4345 | −0.7422 | Plastic | 1.800 | 20.370 | −12.48 |
| S7 | | Aspheric surface | −4.9383 | −1.2283 | | | | |
| S8 | Fourth lens | Aspheric surface | −7.4098 | −1.5000 | Plastic | 1.551 | 55.929 | 10.69 |
| S9 | | Aspheric surface | 22.3535 | w3 | | | | |
| S10 | Fifth lens | Aspheric surface | 7.8248 | −0.8978 | Plastic | 1.551 | 55.929 | −24.10 |
| S11 | | Aspheric surface | 19.5894 | −0.1936 | | | | |
| S12 | Sixth lens | Aspheric surface | 31.0743 | −1.2000 | Plastic | 1.900 | 19.246 | 19.84 |
| S13 | | Aspheric surface | 9.2811 | −0.0500 | | | | |
| S14 | Seventh lens | Aspheric surface | −6.0737 | −0.9502 | Plastic | 1.551 | 55.929 | −15.27 |
| S15 | | Aspheric surface | −3.2527 | w4 | | | | |
| SF1 | Filter | Spherical surface | Infinity | −0.2100 | Glass | 1.517 | 64.210 | |
| SF2 | | Spherical surface | Infinity | −1.1120 | | | | |
| IMA | Image plane | Spherical surface | Infinity | | | | | |

As shown in FIG. 24, during the anti-shaking process of the optical system 100, the position of the image plane IMA remains fixed, and the first element group G1 rotates around the z direction.

During the focusing process of the optical system 100, in the embodiment, the position of the image plane IMA remains fixed, the positions of the first element group G1 and the first lens group G21 remain fixed, and the second lens group G22 moves along the optical axis II, so that the distance between the first lens group G21 and the second lens group G22 (in the embodiment, the fourth lens E4 and the second lens E2) is adjustable.

When the distance from the photographed object to the optical system 100 changes from far to near, the second lens group G22 is able to move towards the image side (in the embodiment, the image plane IMA) along the optical axis II, i.e. increasing the distance between the second lens group G22 and the first lens group G21 on the optical axis II. When the distance from the photographed object to the optical system 100 changes from near to far, the second lens group G22 is able to move towards the first lens group G21 along the optical axis II, i.e. reducing the distance between the second lens group G22 and the first lens group G21 on the optical axis II. In the optical system 100, the second lens group G22 serves as a movable lens group for compensation.

During the movement of the second lens group G22, the distance w3 between the image-side surface of the fourth lens E4 and the object-side surface of the fifth lens E5 on the optical axis II, and the distance w4 between the image-side surface S15 of the seventh lens E7 and the object-side surface SF1 of the filter EF on the optical axis II are variable. When the distance between the photographed object and the optical system 100 is infinity, the w3 is equal to −1.4376 mm, and the w4 is equal to −6.8945 mm. When the distance between the photographed object and the optical system 100 is 30 cm, the w3 is equal to −2.9244 mm, and the w4 is equal to −5.4058 mm.

In this embodiment, the object-side surface and the image-side surface of any one of the first lens E1 to the seventh lens E7 are aspheric surfaces. Table 10 provides conic coefficients K and high-order term coefficients $A_4$, $A_6$, $A_8$, $A_{10}$, $A_{12}$, $A_{14}$, $A_{16}$, $A_{18}$ and $A_{20}$ that is able to be applied to the respective aspheric surfaces S1-S2 and S4-S15 in Embodiment 5.

Figure 25:
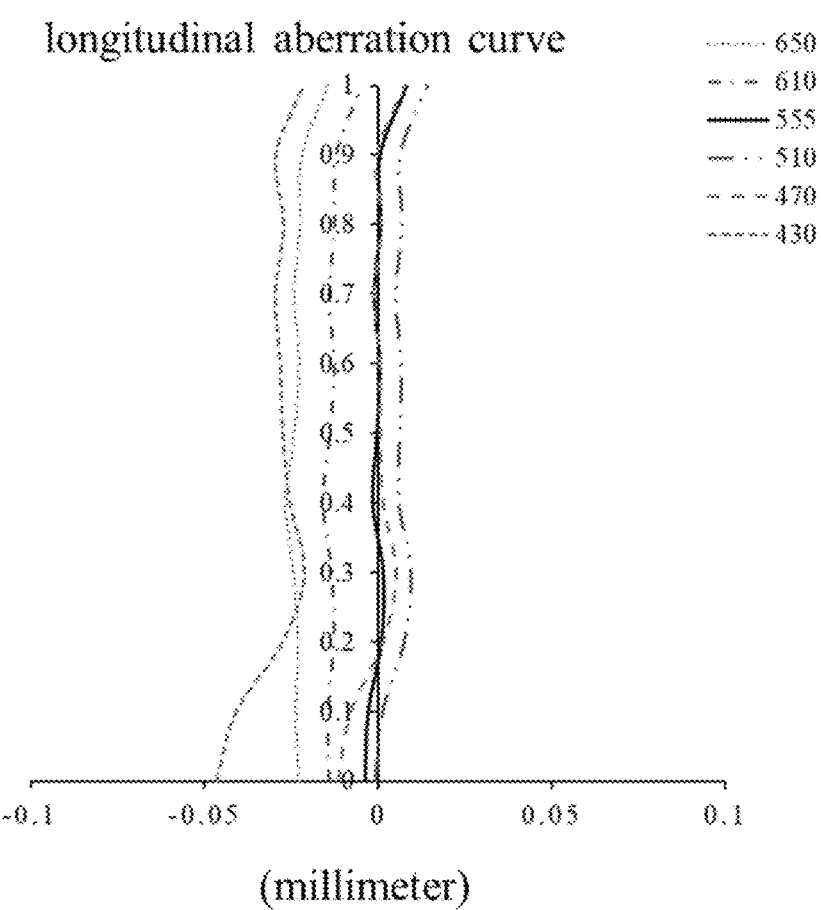
FIG. 25, FIG. 26 and FIG. 27 respectively show a longitudinal aberration curve, an astigmatism curve and a distortion curve of an optical system according to Embodiment 5 of the disclosure.
Figure 26:
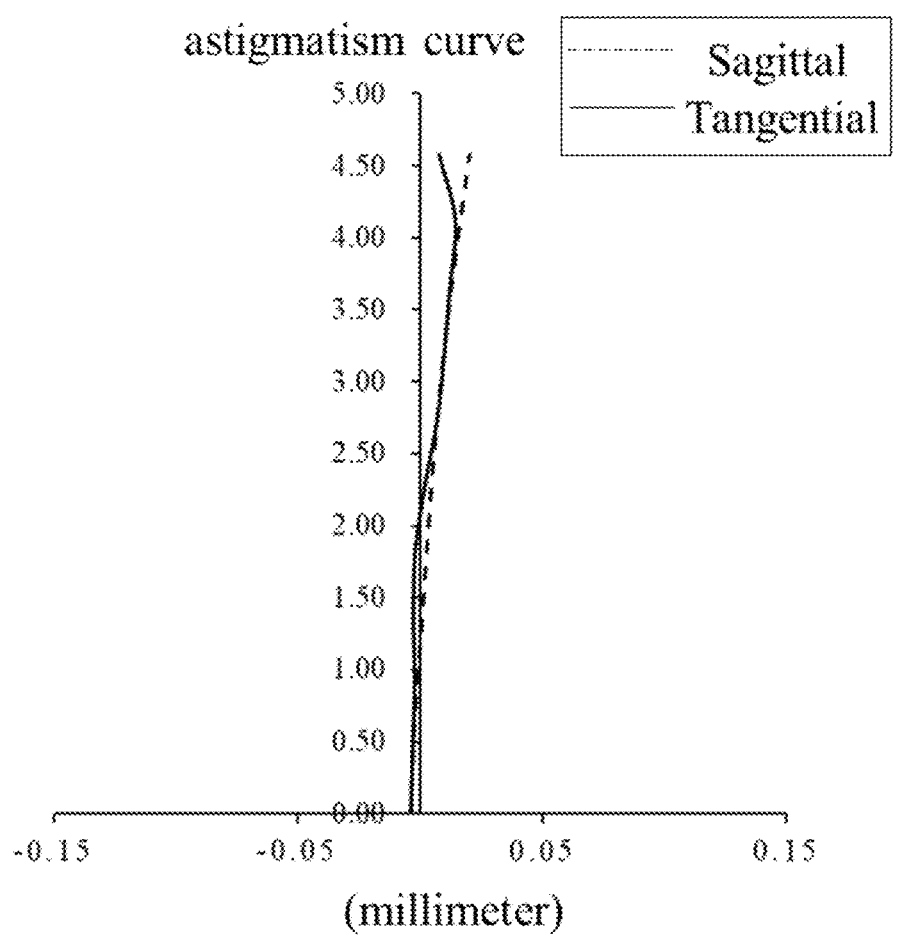
Figure 27:
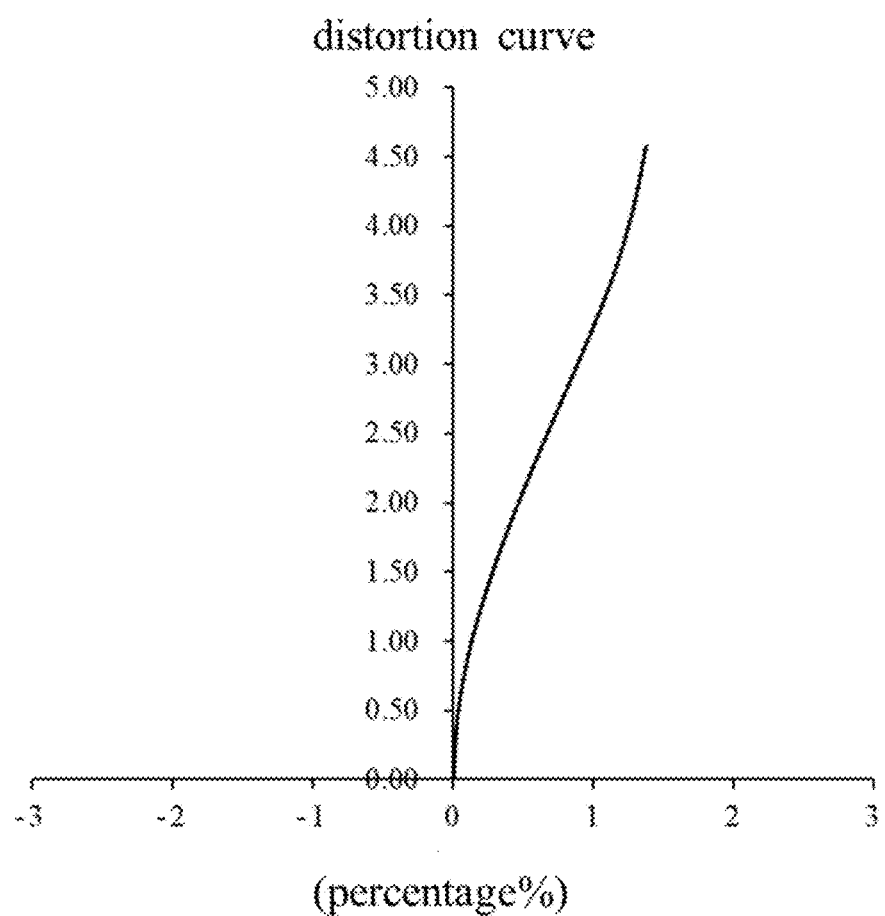

FIG. 25 shows a longitudinal aberration curve of the optical system 100 according to Embodiment 5, which represents the deviation of a convergent focal point of light rays of different wavelengths after passing through the optical system 100. FIG. 26 shows an astigmatism curve of the optical system 100 according to Embodiment 5, which represents the tangential image plane curvature and the sagittal image plane curvature corresponding to different image heights. FIG. 27 shows a distortion curve of the optical system 100 according to Embodiment 5, which represents the distortion magnitude values corresponding to different image heights. It is able to be determined from FIGS. 25, 26 and 27 that the optical system 100 according to Embodiment 5 is able to achieve good imaging quality.

In the disclosure, the value of the FOV ranges from 14.6 to 25.1, the value of the D1 ranges from 4.4 to 6.3, the value of the CT1 ranges from 1.0 to 1.4, the value of the f1 ranges from 43.7 to 85.9, and the value of the EFL ranges from 21.2 to 28.9. The value of the $FG2_m$ ranges from −17.6 to 36.0, the value of the FG2 ranges from 25.9 to 48.6, the value of the SL ranges from 25.5 to 42.2, the value of the EPD ranges from 7.8 to 12.4, the value of the GH ranges from 6.6 to 9.6, the value of the SH ranges from 8.9 to 13.3, the value of the ImgH ranges from 4.0 to 5.2, the value of the α ranges from 7.7 to 8.8, the value of the β ranges from 11.9 to 14.4, the value of the L1S1R ranges from 32.2 to 45.7, and the value of the L2S2R ranges from 19.8 to 63.3. The units of FOV, a and B are degrees (°), and the units of other parameters are all millimeters (mm).

Table 11 shows the values of the FOV, D1, CT1, f1, EFL, $FG2_m$, FG2, SL, EPD, GH, SH, ImgH, a, B, L1S1R and L2S2R for each of Embodiments 1 to 5.

TABLE 10

| Surface number | K | $A_4$ | $A_6$ | $A_8$ | $A_{10}$ | $A_{12}$ | $A_{14}$ | $A_{16}$ | A18 | A20 |
|---|---|---|---|---|---|---|---|---|---|---|
| S1 | 35.400 | −1.79E−01 | −2.50E−02 | −2.00E−03 | 0.00E+00 | 0.00E+00 | 0.00E+00 | 0.00E+00 | 0.00E+00 | 0.00E+00 |
| S2 | −66.890 | −1.38E−01 | −2.30E−02 | −2.00E−03 | 0.00E+00 | 0.00E+00 | 0.00E+00 | 0.00E+00 | 0.00E+00 | 0.00E+00 |
| S4 | −21.352 | −2.00E−01 | 6.90E−02 | −2.00E−03 | 2.00E−03 | −1.00E−03 | 0.00E+00 | 0.00E+00 | 0.00E+00 | 0.00E+00 |
| S5 | −90.000 | 4.00E−03 | 6.00E−02 | −8.00E−03 | 3.00E−03 | −2.00E−03 | 1.00E−03 | 0.00E+00 | 0.00E+00 | 0.00E+00 |
| S6 | 6.375 | 1.90E−01 | −1.90E−02 | −4.00E−03 | 5.00E−03 | −2.00E−03 | 1.00E−03 | 0.00E+00 | 0.00E+00 | 0.00E+00 |
| S7 | −1.577 | 1.89E−01 | −3.40E−02 | −1.00E−03 | 3.00E−03 | −2.00E−03 | 1.00E−03 | 0.00E+00 | 0.00E+00 | 0.00E+00 |
| S8 | −9.542 | −4.60E−02 | 6.40E−02 | −4.00E−03 | −5.00E−03 | −7.00E−03 | −2.00E−03 | −1.00E−03 | 0.00E+00 | 0.00E+00 |
| S9 | −5.364 | −2.10E−02 | 4.30E−02 | 5.00E−03 | 1.00E−03 | −1.00E−03 | 0.00E+00 | 0.00E+00 | 0.00E+00 | 0.00E+00 |
| S10 | 1.264 | −4.90E−01 | 2.90E−02 | −1.00E−03 | −1.00E−03 | 0.00E+00 | 0.00E+00 | 0.00E+00 | 0.00E+00 | 0.00E+00 |
| S11 | −90.000 | −2.68E−01 | 1.70E−02 | 1.10E−02 | −1.00E−03 | 5.00E−03 | 3.00E−03 | 1.00E−03 | 1.00E−03 | 1.00E−03 |
| S12 | 90.000 | −1.95E−01 | −2.70E−02 | −1.10E−02 | 2.00E−03 | 6.00E−03 | 4.00E−03 | 2.00E−03 | 1.00E−03 | 1.00E−03 |
| S13 | −37.481 | 2.13E−01 | −4.90E−02 | −3.00E−03 | −2.00E−03 | 2.00E−03 | 2.00E−03 | 0.00E+00 | 0.00E+00 | 0.00E+00 |
| S14 | −11.272 | 1.16E+00 | −8.00E−02 | 2.90E−02 | −2.00E−03 | 3.00E−03 | 2.00E−03 | 0.00E+00 | 0.00E+00 | 0.00E+00 |
| S15 | −0.862 | 1.96E+00 | −2.34E−01 | 5.20E−02 | −1.30E−02 | 4.00E−03 | −1.00E−03 | 0.00E+00 | 0.00E+00 | 0.00E+00 |

TABLE 11

| Parameter/Embodiment | 1 | 2 | 3 | 4 | 5 |
|---|---|---|---|---|---|
| FOV | 21.207 | 14.614 | 21.199 | 19.755 | 25.066 |
| D1 | 4.900 | 6.298 | 6.194 | 4.518 | 4.443 |
| CT1 | 1.0576 | 1.3900 | 1.3540 | 1.1000 | 1.1000 |
| f1 | 60.55 | 85.83 | 77.14 | 43.71 | 44.89 |
| EFL | 21.280 | 28.850 | 27.230 | 22.695 | 22.695 |
| $FG2_m$ | 25.974 | 35.935 | 33.983 | −17.568 | −17.443 |
| FG2 | 25.974 | 35.935 | 33.983 | 48.503 | 47.269 |
| SL | 31.646 | 42.184 | 39.852 | 27.536 | 27.538 |
| EPD | 9.500 | 12.333 | 12.100 | 7.880 | 7.880 |
| GH | 7.468 | 9.554 | 9.423 | 6.614 | 6.788 |
| SH | 10.300 | 13.300 | 13.000 | 8.900 | 8.900 |
| ImgH | 4.000 | 4.000 | 5.120 | 4.000 | 5.120 |
| α | 8.322 | 7.720 | 8.381 | 8.775 | 8.743 |
| β | 14.019 | 11.923 | 14.330 | 13.611 | 13.634 |
| L1S1R | 32.2985 | 45.6299 | 40.9994 | 33.8748 | 35.1909 |
| L2S2R | 50.8118 | 53.9562 | 63.2311 | 21.2440 | 19.8910 |

Table 12 shows the values of conditional expressions for each of Embodiments 1 to 5.

TABLE 12

| Conditional expression/Embodiment | 1 | 2 | 3 | 4 | 5 |
|---|---|---|---|---|---|
| tan(FOV/2) | 0.187 | 0.128 | 0.187 | 0.174 | 0.222 |
| D1/CT1 | 4.633 | 4.531 | 4.574 | 4.107 | 4.039 |
| \|f1/EFL\| | 2.845 | 2.975 | 2.833 | 1.926 | 1.978 |
| \|$FG2_m$/EFL\| | 1.221 | 1.246 | 1.248 | 0.774 | 0.769 |
| \|f1/$FG2_m$\| | 2.331 | 2.388 | 2.270 | 2.488 | 2.574 |
| \|f1/FG2\| | 2.331 | 2.388 | 2.270 | 0.901 | 0.950 |
| EFL/SL | 0.672 | 0.684 | 0.683 | 0.824 | 0.824 |
| SL/EPD | 3.331 | 3.420 | 3.294 | 3.494 | 3.495 |
| GH/EPD | 0.786 | 0.775 | 0.779 | 0.839 | 0.861 |
| SH/EPD | 1.084 | 1.078 | 1.074 | 1.129 | 1.129 |
| ImgH/EFL | 0.188 | 0.139 | 0.188 | 0.176 | 0.226 |
| tanβ/tanα | 1.707 | 1.558 | 1.734 | 1.569 | 1.577 |
| L1S1R/EFL | 1.518 | 1.582 | 1.506 | 1.493 | 1.551 |
| L2S2R/EFL | 2.388 | 1.870 | 2.322 | 0.936 | 0.876 |

Table 13 shows the vertical axis values of defocus curves for each of Embodiments 1 to 5. The defocus curve represents a change in the MTF value when the image plane deviates from the design value. The horizontal coordinate represents the front/back deviation distance of the image plane, and the vertical coordinate represents the MTF value. The vertical axis value represents the MTF value of the vertical coordinate when the horizontal coordinate is 0. Comparative examples 1-1 to 1-5 represent the non-anti-shaking state. Comparative examples 2-1 to 2-5 represent that the first element group G1 rotates around the y direction to achieve the anti-shaking effect. It should be noted that the structural parameters, basic parameters described above, of the optical system 100 in Comparative examples 1-1 to 1-5 are the same as those in Embodiments 1 to 5, respectively, and the structural parameters, basic parameters described above, of the optical system 100 in Comparative examples 2-1 to 2-5 are the same as those in Embodiments 1 to 5, respectively.

TABLE 13

| Field of view/Embodiment of the disclosure or Comparative example | Comparative example 1-1 | | Embodiment 1 | | Comparative example 2-1 | |
|---|---|---|---|---|---|---|
| | Tangential plane | Sagittal plane | Tangential plane | Sagittal plane | Tangential plane | Sagittal plane |
| Central field of view | 0.874 | 0.874 | 0.874 | 0.874 | 0.872 | 0.874 |
| Edge field of view | 0.872 | 0.823 | 0.872 | 0.823 | 0.786 | 0.683 |

| Field of view/Embodiment of the disclosure or Comparative example | Comparative example 1-2 | | Embodiment 2 | | Comparative example 2-2 | |
|---|---|---|---|---|---|---|
| | Tangential plane | Sagittal plane | Tangential plane | Sagittal plane | Tangential plane | Sagittal plane |
| Central field of view | 0.856 | 0.856 | 0.856 | 0.856 | 0.846 | 0.853 |
| Edge field of view | 0.856 | 0.827 | 0.856 | 0.827 | 0.780 | 0.732 |

| Field of view/Embodiment of the disclosure or Comparative example | Comparative example 1-3 | | Embodiment 3 | | Comparative example 2-3 | |
|---|---|---|---|---|---|---|
| | Tangential plane | Sagittal plane | Tangential plane | Sagittal plane | Tangential plane | Sagittal plane |
| Central field of view | 0.859 | 0.859 | 0.859 | 0.859 | 0.852 | 0.858 |
| Edge field of view | 0.853 | 0.793 | 0.853 | 0.793 | 0.746 | 0.633 |

TABLE 13-continued

| Field of view/ Embodiment of the disclosure or Comparative example | Comparative example 1-4 | | Embodiment 4 | | Comparative example 2-4 | |
|---|---|---|---|---|---|---|
| | Tangential plane | Sagittal plane | Tangential plane | Sagittal plane | Tangential plane | Sagittal plane |
| Central field of view | 0.835 | 0.835 | 0.835 | 0.835 | 0.792 | 0.820 |
| Edge field of view | 0.831 | 0.785 | 0.831 | 0.785 | 0.700 | 0.665 |

| Field of view/ Embodiment of the disclosure or Comparative example | Comparative example 1-5 | | Embodiment 5 | | Comparative example 2-5 | |
|---|---|---|---|---|---|---|
| | Tangential plane | Sagittal plane | Tangential plane | Sagittal plane | Tangential plane | Sagittal plane |
| Central field of view | 0.834 | 0.834 | 0.834 | 0.834 | 0.785 | 0.817 |
| Edge field of view | 0.818 | 0.759 | 0.818 | 0.759 | 0.668 | 0.596 |

The vertical axis value is able to reflect the MTF value of the optical system 100 in the absence of astigmatism, i.e. the lens imaging quality at an ideal image plane. A higher MTF value indicates that the imaging contrast is more pronounced and the imaging quality of an optical lens is better. The central field of view is able to reflect an upper limit of the imaging quality of an optical system, and the edge field of view is able to reflect a lower limit of the imaging quality of the optical system. The edge field of view is a field of view approximately at the position of 0.8 times the image height.

As shown in Table 13, by comparing the vertical axis values of the tangential planes and the sagittal planes of a central field of view and an edge field of view, it is able to be determined that the vertical axis values in the Embodiments 1 to 5 are consistent with those in the Comparative examples 1-1 to 1-5, respectively (i.e. the non-anti-shaking state), which indicates that the anti-shaking solutions (i.e. the first element group G1 rotating around the z direction) provided by the Embodiments 1 to 5 of the disclosure do not affect the MTF performance. However, compared with the vertical axis values in the Comparative Examples 1-1 to 1-5 (i.e. the non-anti-shaking state), the anti-shaking solutions (i.e. the first element group G1 rotating around the y direction) provided by the Comparative examples 2-1 to 2-5 show a significant decrease in the vertical axis value at the edge field of view, which indicates that the anti-shaking solutions have a great effect on the vertical axis values at an outer field of view.

In conclusion, the optical system 100 provided in embodiments of the disclosure has better and more stable performance of the vertical axis values at different fields of view (in an embodiment, the central field of view and the edge field of view), and has good imaging quality and higher production yield. It is more advantageous to use the anti-shaking solution provided in the disclosure.

The disclosure further provides a camera module. In an embodiment, the camera module is a periscope camera module. The camera module includes the described optical system and an imaging element for converting an optical image formed by the optical system into an electrical signal.

The description above is only illustration about the preferred embodiments of the disclosure and technical principles adopted. A person skilled in the art should understand that the scope of disclosure involved in the disclosure is not limited to the technical solutions formed by specifically combining the technical features and should also cover other technical solutions formed by arbitrarily combining the technical features or equivalent features thereof without departing from the inventive concept. For example, technical solutions formed by mutually replacing the features and (but not limited to) the technical features with similar functions disclosed in the disclosure.

What is claimed is:

1. An optical system, sequentially comprising from an object side to an image side:
   a first lens having a positive refractive power, wherein the first lens is configured to allow propagation of light rays along a first optical axis;
   a reflective element, wherein the reflective element is configured to change light rays emitted from the first lens from propagating along the first optical axis to propagating along a second optical axis, wherein the first lens and the reflective element constitute a first element group; and
   a second element group having a positive refractive power;
   wherein during an anti-shaking process, a position of an image plane of the optical system remains fixed, and the first element group rotates around a direction parallel to the second optical axis;
   an effective focal length f1 of the first lens and an effective focal length EFL of the optical system satisfy: 1.9<|f1/EFL|<3.0; and
   the second element group comprises a second lens closest to the reflective element, and an angle α between a marginal ray of a central field of view after passing through the first lens and the first optical axis, and an angle β between a marginal ray of a central field of view after passing through the second lens and the second optical axis satisfy: 1.5<tan β/tan α<1.8.

2. The optical system according to claim 1, wherein a maximum field of view FOV of the optical system satisfies: 0.1<tan (FOV/2)<0.23.

3. The optical system according to claim 1, wherein a maximum effective half-aperture D1 of the first lens and a center thickness CT1 of the first lens on the first optical axis satisfy: 4.0<D1/CT1<4.7.

4. The optical system according to claim 1, wherein the second element group comprises a movable lens group, and an effective focal length $FG2_m$ of the movable lens group and the effective focal length EFL of the optical system satisfy: 0.7<|$FG2_m$/EFL|<1.3.

5. The optical system according to claim 1, wherein the second element group comprises a movable lens group, and the effective focal length f1 of the first lens and an effective focal length $FG2_m$ of the movable lens group satisfy: $2.2<|f1/FG2_m|<2.6$.

6. The optical system according to claim 1, wherein the effective focal length f1 of the first lens and an effective focal length FG2 of the second element group satisfy: $0.9<|f1/FG2|<2.5$.

7. The optical system according to claim 1, wherein the effective focal length EFL of the optical system and a total length SL of the optical system on the second optical axis satisfy: $0.6<EFL/SL<0.9$.

8. The optical system according to claim 1, wherein a total length SL of the optical system on the second optical axis and an entrance pupil diameter EPD of the optical system satisfy:

$$3.2<SL/EPD<3.5.$$

9. The optical system according to claim 1, wherein a shoulder height GH of the optical system and an entrance pupil diameter EPD of the optical system satisfy: $0.7<GH/EPD<0.9$.

10. The optical system according to claim 1, wherein a total height SH of the optical system and an entrance pupil diameter EPD of the optical system satisfy: $1.0<SH/EPD<1.15$.

11. The optical system according to claim 1, wherein half of a diagonal length ImgH of an effective pixel area on the image plane and the effective focal length EFL of the optical system satisfy: $0.1<ImgH/EFL<0.3$.

12. The optical system according to claim 1, wherein a radius of curvature L1S1R of an object-side surface of the first lens and the effective focal length EFL of the optical system satisfy: $1.4<L1S1R/EFL<1.6$.

13. The optical system according to claim 1, wherein the second element group comprises a second lens closest to the reflective element, and a radius of curvature L2S2R of an image-side surface of the second lens and the effective focal length EFL of the optical system satisfy: $0.8<L2S2R/EFL<2.4$.

14. The optical system according to claim 1, wherein the second element group has a positive refractive power, and during a focusing process, the second element group moves along the second optical axis.

15. The optical system according to claim 1, wherein the second element group sequentially comprises from the reflective element to the image side:
   a first lens group having a positive refractive power; and
   a second lens group having a negative refractive power,
   during a focusing process, a position of the first lens group remaining fixed, and the second lens group moving along the second optical axis.

16. The optical system according to claim 1, wherein the image plane is perpendicular to the second optical axis.

17. A camera module, comprising the optical system according to claim 1 and an imaging element for converting an optical image formed by the optical system into an electrical signal.

* * * * *